US007835120B2

(12) United States Patent
Fasano

(10) Patent No.: US 7,835,120 B2

(45) Date of Patent: Nov. 16, 2010

(54) CIRCUIT BREAKERS WITH GROUND FAULT AND OVERCURRENT TRIP

(75) Inventor: Michael A. Fasano, Watertown, CT (US)

(73) Assignee: Carling Technologies, Inc., Plainville, CT (US)

( * ) Notice: Subject to any disclaimer, the term of this patent is extended or adjusted under 35 U.S.C. 154(b) by 98 days.

(21) Appl. No.: 12/047,894

(22) Filed: Mar. 13, 2008

(65) Prior Publication Data

US 2008/0247100 A1 Oct. 9, 2008

Related U.S. Application Data

(60) Provisional application No. 60/894,479, filed on Mar. 13, 2007.

(51) Int. Cl.
*H02H 3/00* (2006.01)
*H02H 9/08* (2006.01)

(52) U.S. Cl. ............................ 361/42; 361/43; 361/44; 361/45; 361/46; 361/47; 361/48; 361/49; 361/50

(58) Field of Classification Search ....................... None
See application file for complete search history.

(56) References Cited

U.S. PATENT DOCUMENTS 3,898,528 A * 8/1975 Runtsch et al. ............... 361/45
4,037,185 A 7/1977 Klein
5,179,491 A * 1/1993 Runyan ....................... 361/45
5,331,301 A 7/1994 Glennon et al.
5,510,658 A * 4/1996 Nakayama ................. 307/10.1
6,757,626 B2 * 6/2004 Dougherty et al. ............ 702/58
7,424,925 B2 * 9/2008 Buglione et al. ......... 180/65.31
2007/0091520 A1 * 4/2007 Angelides et al. ............. 361/42

FOREIGN PATENT DOCUMENTS

EP 0 074 576 3/1983

OTHER PUBLICATIONS

International Search Report and Written Opinion, PCT/US2008/056867, Date mailed Sep. 23, 2008.

* cited by examiner

*Primary Examiner*—Jared J Fureman
*Assistant Examiner*—Dharti H Patel
(74) *Attorney, Agent, or Firm*—Cantor Colburn LLP

(57) ABSTRACT

A circuit breaker apparatus may be used to interrupt overcurrent and ground fault in a circuit. The circuit breaker apparatus may include an overcurrent coil for tripping the circuit breaker apparatus, a voltage coil also for tripping the circuit breaker apparatus located proximate to the overcurrent coil, and ground fault electronics connected to the voltage coil and structured to detect a ground fault in the circuit when the ground fault exceeds a threshold level. The ground fault electronics can be structured to send a trip signal to the voltage coil when a ground fault is detected, and the voltage coil can be structured to trip the circuit breaker apparatus when it receives the trip signal from the ground fault electronics.

22 Claims, 40 Drawing Sheets

CIRCUIT BREAKERS WITH GROUND FAULT AND OVERCURRENT TRIP

CROSS REFERENCE TO RELATED APPLICATION

This application claims priority to U.S. Provisional Application No. 60/894,479 filed Mar. 13, 2007, the entire contents of which are incorporated herein by reference.

FIELD OF INVENTION

This invention is related to the circuit breaker art.

BACKGROUND

Overcurrent or excess current is a situation where a larger than intended electrical current flows through a conductor, leading to excessive generation of heat and the risk of damaging infrastructure, equipment and causing fires. Possible causes for overcurrent include short circuits, excessive load, and incorrect design. To protect against these hazards, devices such as circuit breakers or fuses may be used. These devices can be designed to interrupt the circuit when an overcurrent occurs, allowing the hazard to be corrected. U.S. Pat. No. 4,347,488, the contents of which are incorporate herein by reference, shows one possible example of a conventional circuit breaker.

A ground fault can also pose a number of hazards such as risk of fire, damage to equipment, and risk of electrical shock. Additionally, over a period of time, a ground fault can waste significant energy, resulting in economic loss. A conventional circuit breaker or fuse may not detect and interrupt a ground fault, however. Therefore, it is desirable to have a circuit breaker apparatus that can protect against both overcurrent and ground fault, and to have such a circuit breaker apparatus in a compact and economical package.

SUMMARY OF THE INVENTION

At least an embodiment of circuit breaker apparatus may be used to interrupt overcurrent and ground fault in a circuit. The circuit breaker apparatus may include an overcurrent coil for tripping the circuit breaker apparatus, a voltage coil also for tripping the circuit breaker apparatus located proximate to the overcurrent coil, and ground fault electronics connected to the voltage coil and structured to detect a ground fault in the circuit when the ground fault exceeds a threshold level. The ground fault electronics can be structured to send a trip signal to the voltage coil when a ground fault is detected, and the voltage coil can be structured to trip the circuit breaker apparatus when it receives the trip signal from the ground fault electronics.

At least an embodiment of a method of interrupting overcurrent and ground fault in a circuit including a load may include providing an overcurrent coil for tripping a circuit breaker apparatus, providing a voltage coil for tripping the circuit breaker apparatus, the voltage coil being proximate to the overcurrent coil, detecting a ground fault in the circuit when the ground fault exceeds a threshold level by using ground fault electronics connected to the voltage coil, sending a trip signal from the ground fault electronics to the voltage coil when a ground fault is detected, and using the voltage coil to trip the circuit breaker apparatus when the voltage coil receives the trip signal from the ground fault electronics.

At least an embodiment of a device for interrupting overcurrent and ground fault in a circuit may include means for detecting and interrupting an overcurrent, means for detecting a ground fault above a threshold level, means for interrupting a ground fault, and means for sending a trip signal to the means for interrupting a ground fault when the ground fault is above a threshold level.

At least an embodiment of a device for interrupting overcurrent and ground fault in a circuit may include a circuit breaker module and a ground fault electronics module. The circuit breaker module may include an overcurrent coil for tripping the circuit breaker apparatus, and a voltage coil also for tripping the circuit breaker apparatus located proximate to the overcurrent coil. The ground fault electronics module may include ground fault electronics connected to the voltage coil and structured to detect a ground fault in the circuit when the ground fault exceeds a threshold level. The ground fault electronics may be structured to send a trip signal to the voltage coil when a ground fault is detected, and the voltage coil may be structured to trip the circuit breaker module when it receives the trip signal from the ground fault electronics.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
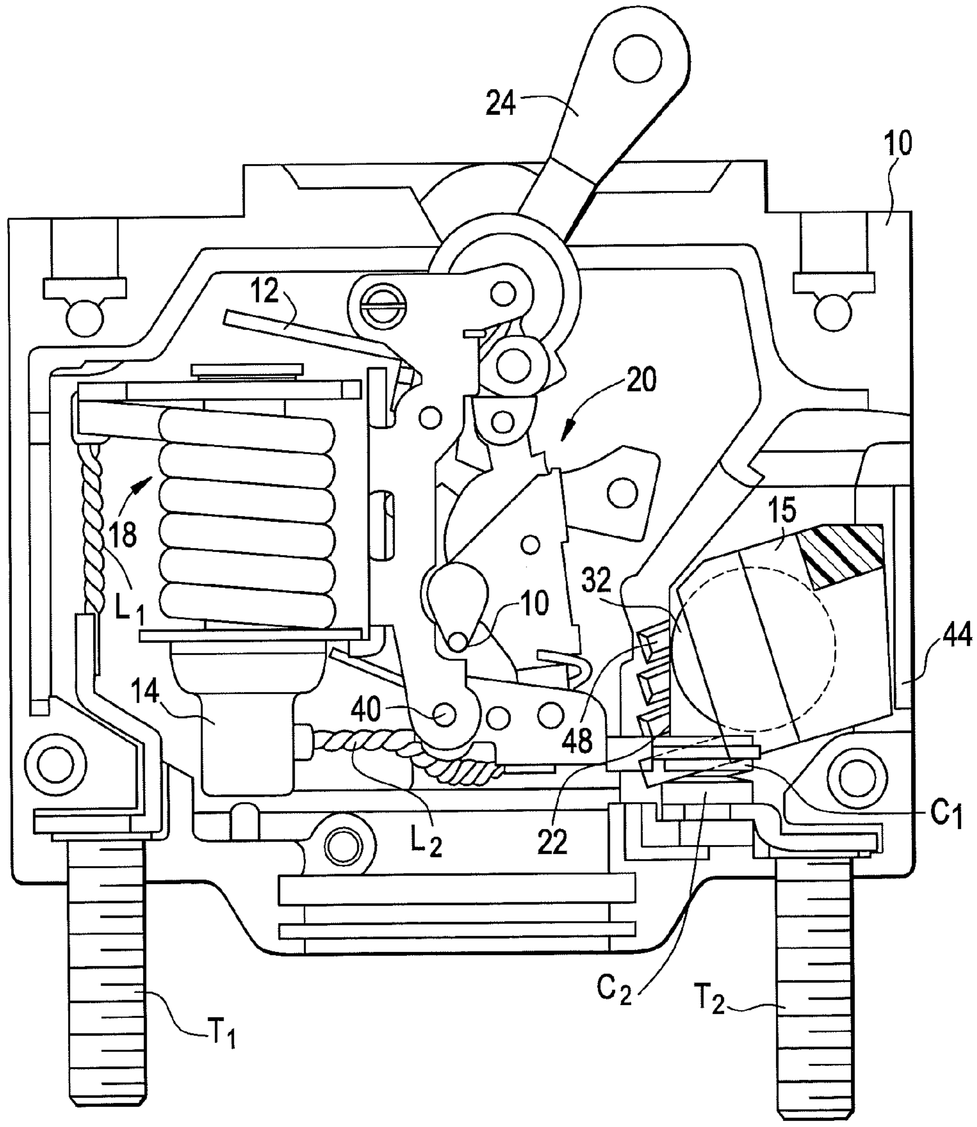
FIG. 1 PRIOR ART
FIG. 1 is a side view of a magnetic circuit breaker having a conventional overcurrent feature and circuit breaker mechanism.

FIG. 1 shows a magnetic circuit breaker having a conventional circuit breaker mechanism such as that disclosed in U.S. Pat. No. 4,347,488 entitled "MULTI-POLE CIRCUIT BREAKER" issued Aug. 31, 1982 and assigned to the assignee herein. Such a circuit breaker mechanism includes a collapsible link 20 that is provided between a movable contact arm 22 and a pivotably mounted toggle lever actuator 24. The collapsible link is adapted to be operated without collapsing by the actuator 24 so as to achieve direct opening and closing movement of the movable contact arm 22 between the positions illustrated in FIG. 1 and FIG. 2. Such a circuit breaker is connected in a circuit to be protected through terminals $T_1$ and $T_2$. Terminal $T_1$ is connected by a lead $L_1$ to an internal electromagnetic coil 18, and from the coil 18 to the movable contact arm by a lead $L_2$. When the movable contact arm 22 is in the position shown for it in FIG. 1, a movable contact $C_1$ provided on the movable contact arm 22 engages a fixed contact $C_2$ mounted on the fixed post or terminal $T_2$. Thus in this position, the breaker has closed circuit and current can flow through the coil 18. Unless the current flow is manually interrupted by movement of the toggle lever actuator 24, the current in the circuit in which the circuit breaker is provided will continue to flow until the current in that circuit and hence in the coil 18 exceeds a predetermined threshold level for the magnetic circuit breaker for which the magnetic circuit breaker is designed. Above the permitted threshold current level, such an "over current" event or condition in the coil 18 alters the magnetic field of the coil 18 and the breaker mechanism pulling a core (not shown) inside the coil 18 and inside the element 14 upwardly, thereby drawing the armature 12 downward.

Figure 2:
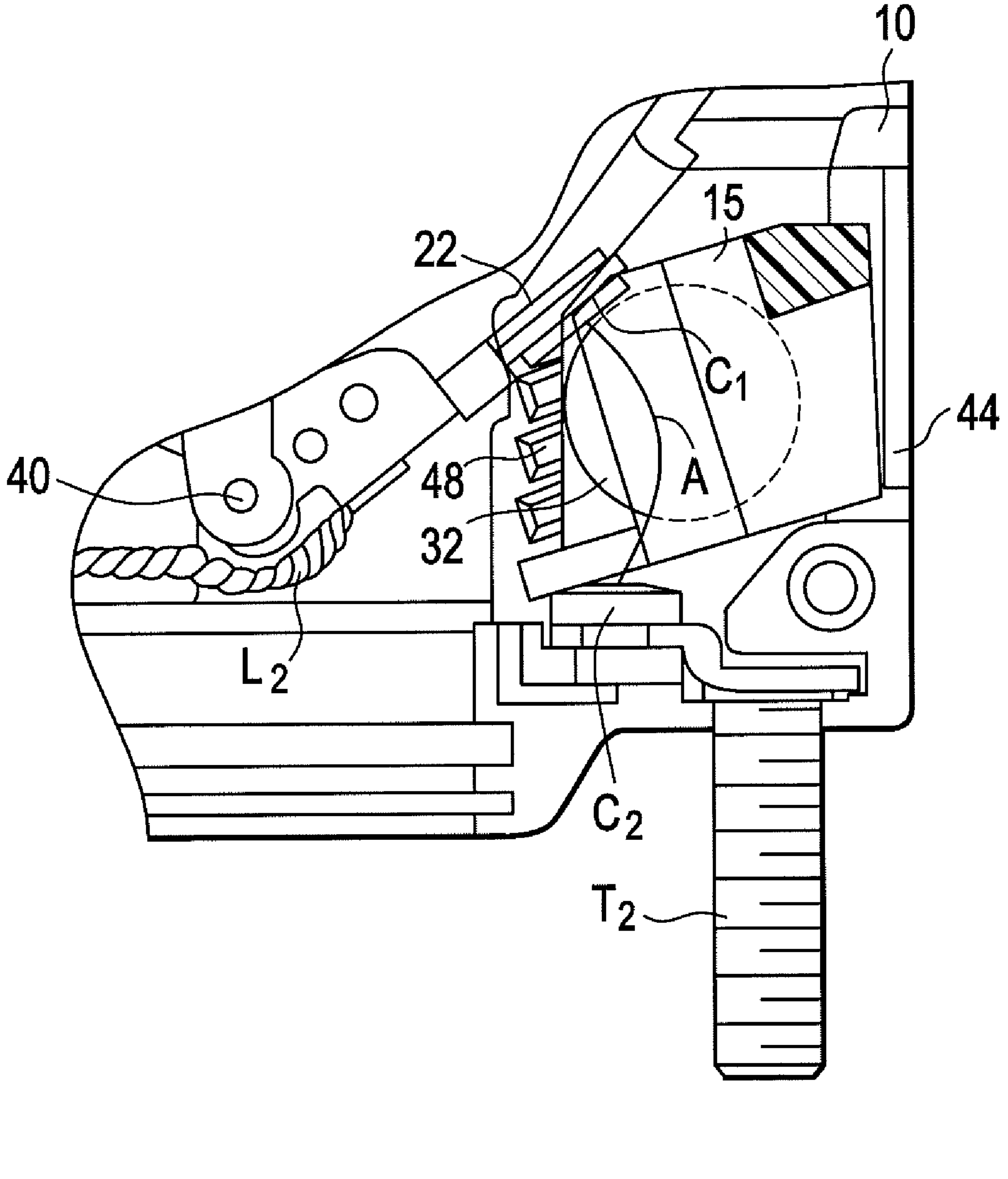
FIG. 2 PRIOR ART
FIG. 2 is an enlarged sectional view of the area near moveable the contact arm of FIG. 1.

The armature 12 includes a depending leg (not shown) that will cause the pin means 10 to rotate in a counterclockwise direction collapsing the link 20 so that the spring biased movable contact arm 22 moves from its closed position of FIG. 1 to the open position illustrated in FIG. 2.

Turning now to the present invention, it is noted first overall that in the present embodiments, over current detection and over current trip capability are implemented by use of an overcurrent detection coil 18 in a similar manner as discussed above or by any standard overcurrent detection means.

Figure 3:
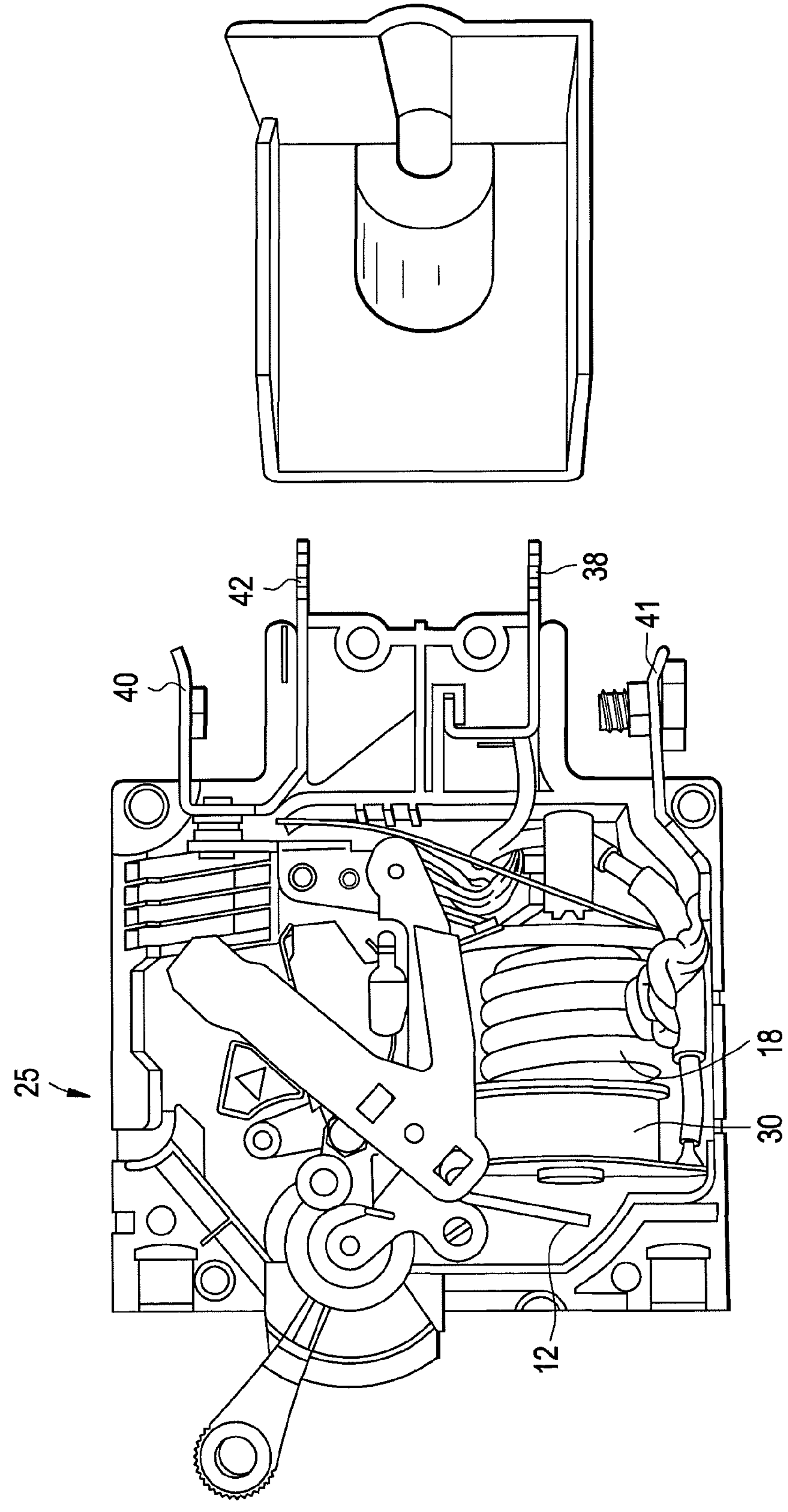
FIG. 3 is a side view of a magnetic circuit breaker with overcurrent and ground fault actuation according to an embodiment.

Second as best seen in FIG. 3, in an embodiment, it is noted that an additional second coil, i.e., a voltage coil 30 is also placed in a "stacked" orientation proximate to overcurrent detection coil 18. Voltage coil 30 may also act to trip the breaker 25 (if a ground fault exists) by magnetically pulling armature 12 downward. The voltage coil 30 trips the breaker 25 when instructed to do so by a signal sent from the Ground Fault Circuit Interrupt electronics 35 (see FIG. 6) (hereinafter GFCI).

Figure 4:
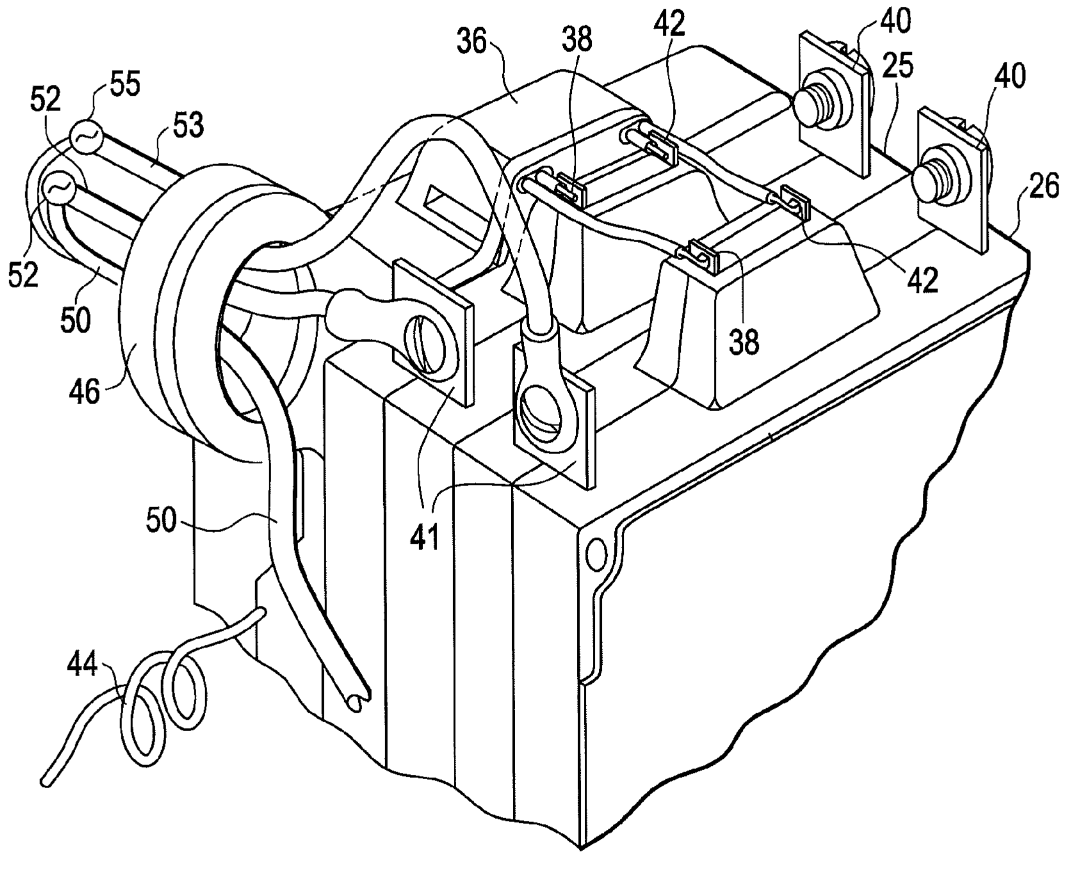
FIG. 4 is a perspective view of a magnetic circuit breaker with overcurrent and ground fault actuation according to an embodiment.
Figure 6:
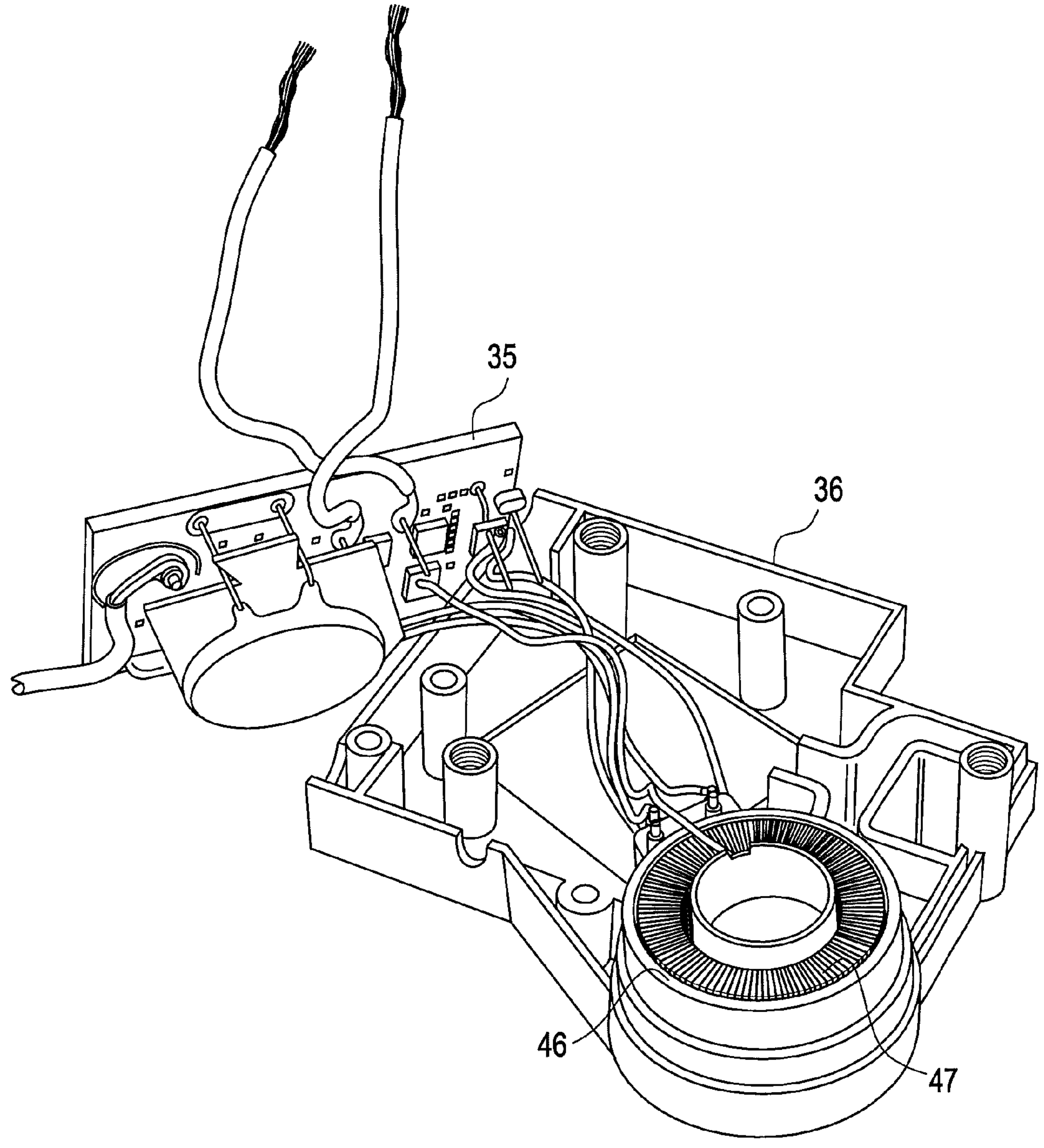
FIG. 6 is a perspective view of the interior of the differential current transformer and ground fault electronics module.

As best seen in FIGS. 4 and 6, a feature of at least this embodiment is that GFCI electronics 35 may be conveniently included in GFCI electronics module 36. The module 36 is conveniently sized in this embodiment so that it will simply be located next to breaker 25 for a single pole installation (see FIG. 4). Also, circuit breaker boxes typically have standard sized holes, or empty spaces, sized for accepting circuit breakers, thus it is beneficial to make any accessories sized so that they fit into these standard sized holes. Also, for double pole installations, an additional breaker 26 (Pole 2) may be located next to breaker 25. Several variations of the double pole system are possible as discussed in more detail below. Multiple poles may also be implemented.

As best seen in FIG. 3, when a ground fault or current drain is detected by GFCI electronics 35, the GFCI electronics 35 send a trip signal to integrated ground fault signal input terminal 38 which is wired to one terminal of the voltage coil 30. The extra terminal 38 is therefore an important and integrated feature which is not present on prior art devices.

As a non-limiting example, a ground fault might be a 6 milliamp drain which is then detected by the ground fault electronics 35. The threshold for the ground fault is programmable so 6 milliamps is just one example of a programmed threshold and any suitable value is possible.

Also in FIG. 3, the other terminal of voltage coil 30 is wired to the main output power or "line-out" terminal 41. Main input power "line-in" terminal 40 sends current to the overcurrent coil 18. Also in this embodiment, another feature is that main input power "line-in" terminal 40 is also connected to GF electronics power terminal 42. In this embodiment, terminals 40 and 42 are made from the same piece of metal. In this way, with the inclusion of terminals 40, 42 into breaker 25, the GFCI module can be powered and also return a signal directly via terminal 38 to breaker 25 in a compact and integrated design.

As seen in FIG. 4, the GFCI module 36 also includes a flying lead wire 44 which serves a system neutral function, i.e., to complete the GFCI electronics 35 circuit.

In summary, the structures and electrical circuits for tripping the breaker 25 when a ground fault is detected have been discussed. The structures and electronics for detection of a ground fault are discussed next, i.e., the differential current transformer 46 as best seen in FIGS. 4, 5, and 6.

Turning to FIG. 4, it is seen that in this embodiment, three wires (50, 52, and 53) are sent through the wire hole of the differential current transformer 46. Specifically, the wires included are a wire 52 connected to "line out" load terminal 41 on one end, and to a device to be powered on the other end such as a motor 55 or any desired load 55, another wire 53 connected to "line out" load terminal 41 on one end and to a device such as a motor 55 or any desired load 55, and system neutral wire 50 which completes the circuit to the connected loads 55.

As seen in FIG. 6, the differential current transformer 46 comprises many turns of small coils 47 which make a magnetic field when a current is passed through them. The transformer 46 is also integrated into the outer body of the GFCI module 36 itself. Changes in this magnetic field indicate ground faults in at least one of the three wires (50, 52, and 53) which are sent through the wire hole of the differential current transformer 46. Also, as discussed above, the GFCI electronics 35 are programmable. Thus, if a ground fault or drain such as a programmed 5 milliamp threshold level drain is not present for example in the three wires passed through differential current transformer 46, then no ground fault is said to exist. Thus, any level of ground fault threshold can be programmed into the GFCI electronics 35 (see circuit board in FIG. 5), which makes the overall breaker 25 very versatile. Any suitable electronics circuit may be used.

Figure 5:
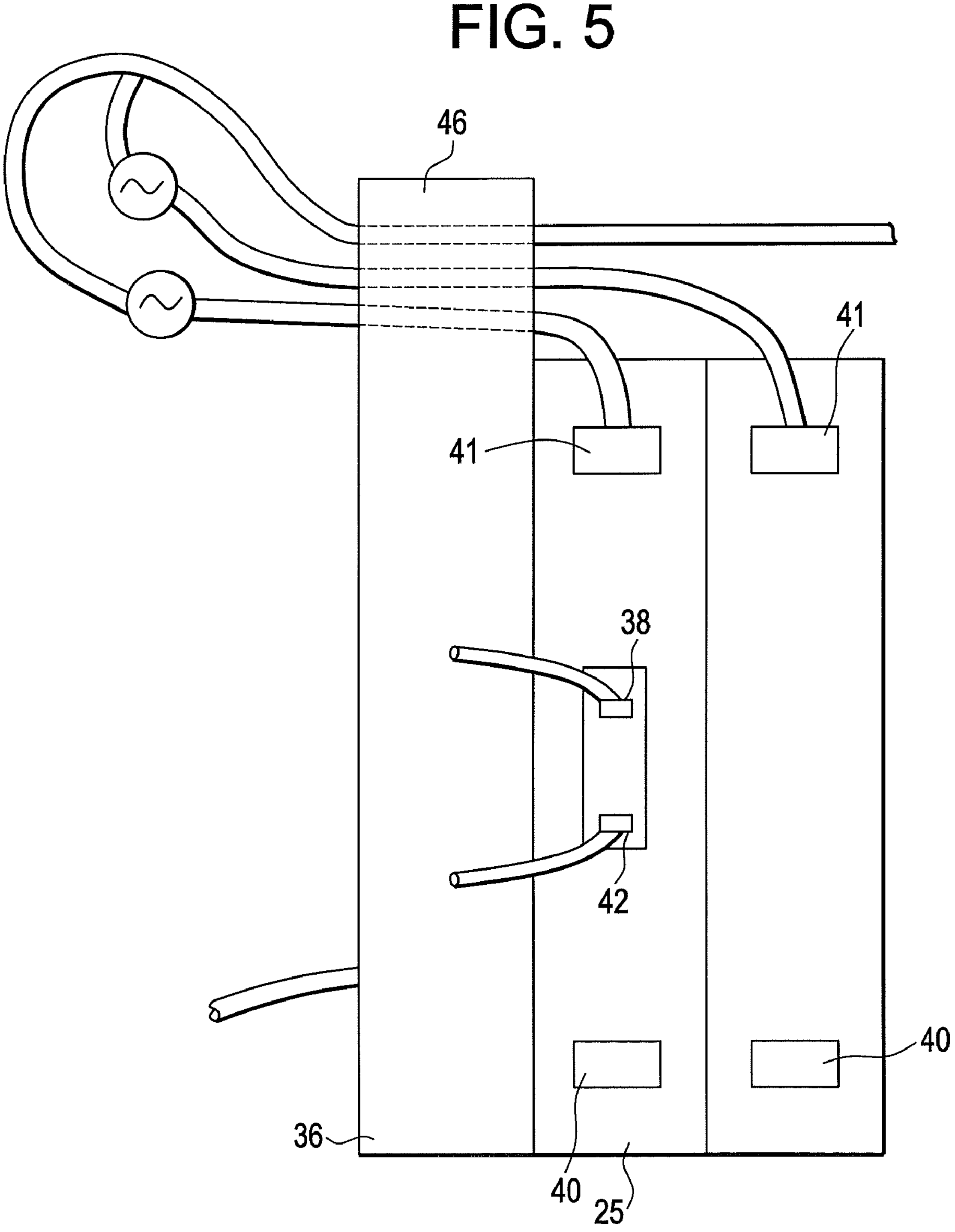
FIG. 5 is a top view of a magnetic circuit breaker with overcurrent and ground fault actuation according to another embodiment.
Figure 5A:
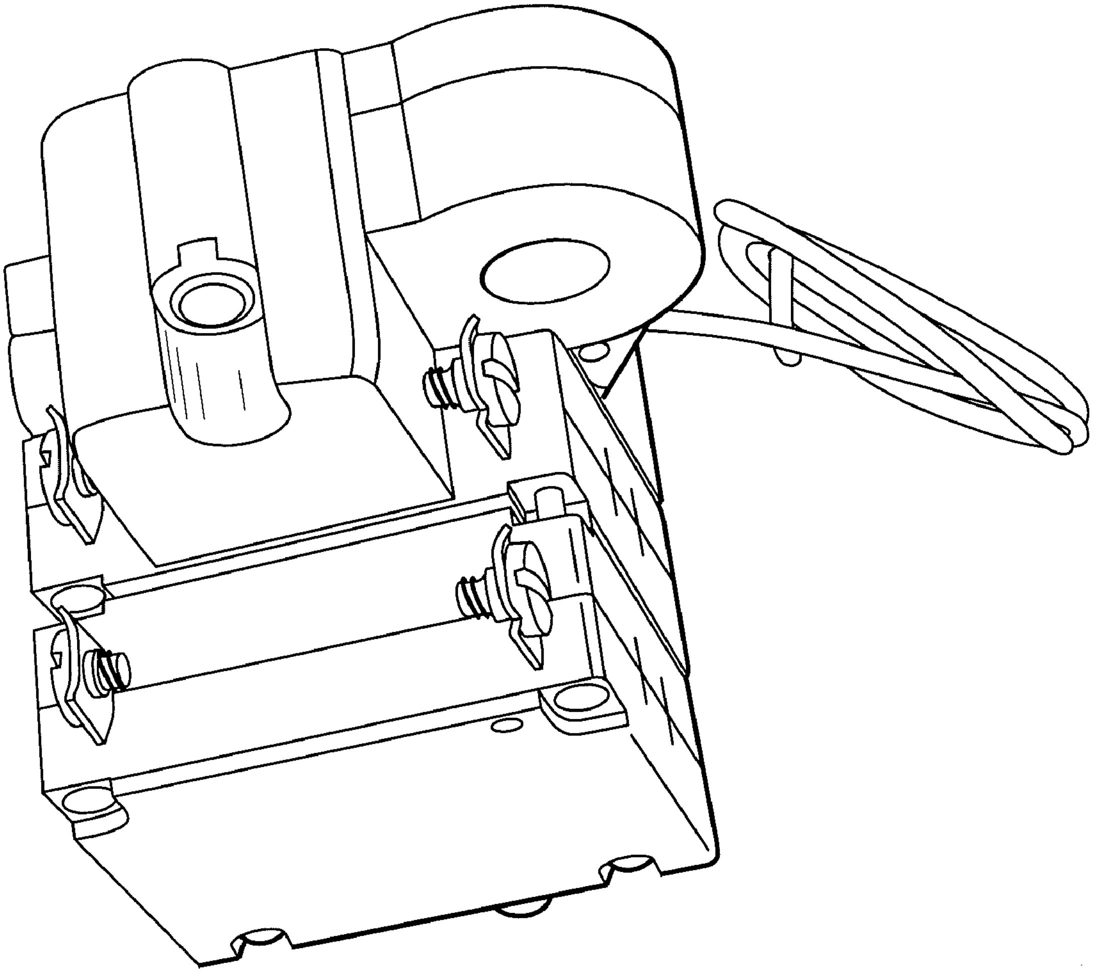
FIG. 5A is a perspective view of a magnetic circuit breaker with overcurrent and ground fault actuation according to the embodiment of FIG. 5.
Figure 5B:
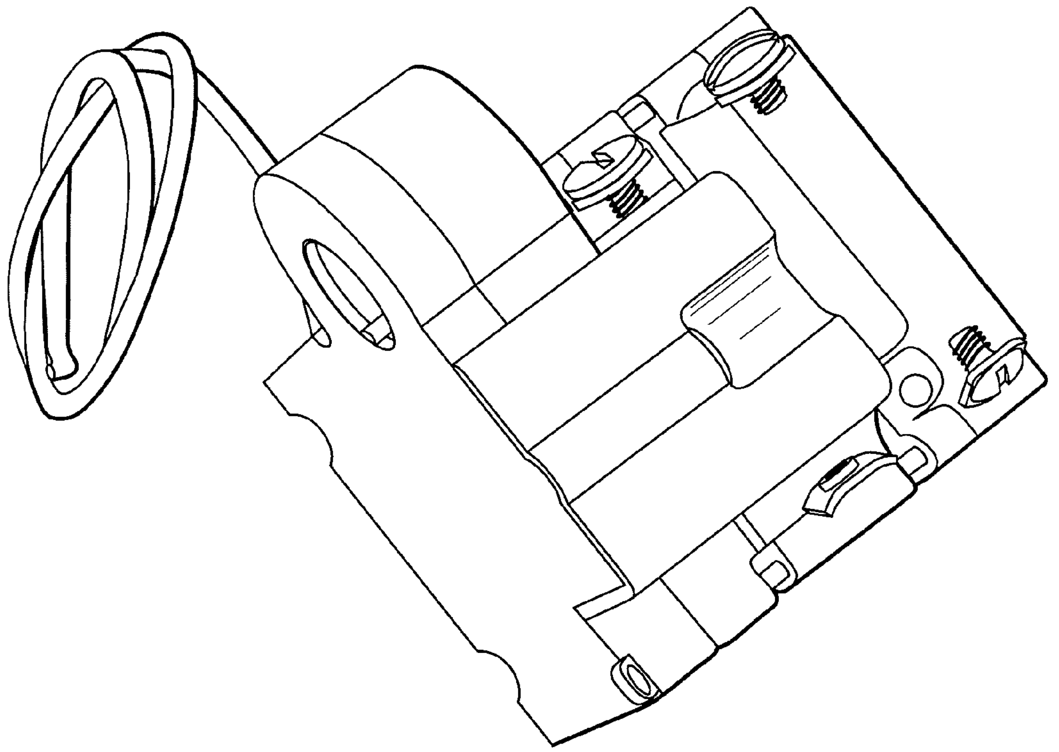
FIG. 5B is a perspective view of a magnetic circuit breaker with overcurrent and ground fault actuation according to the embodiment of FIG. 5.
Figure 5C:
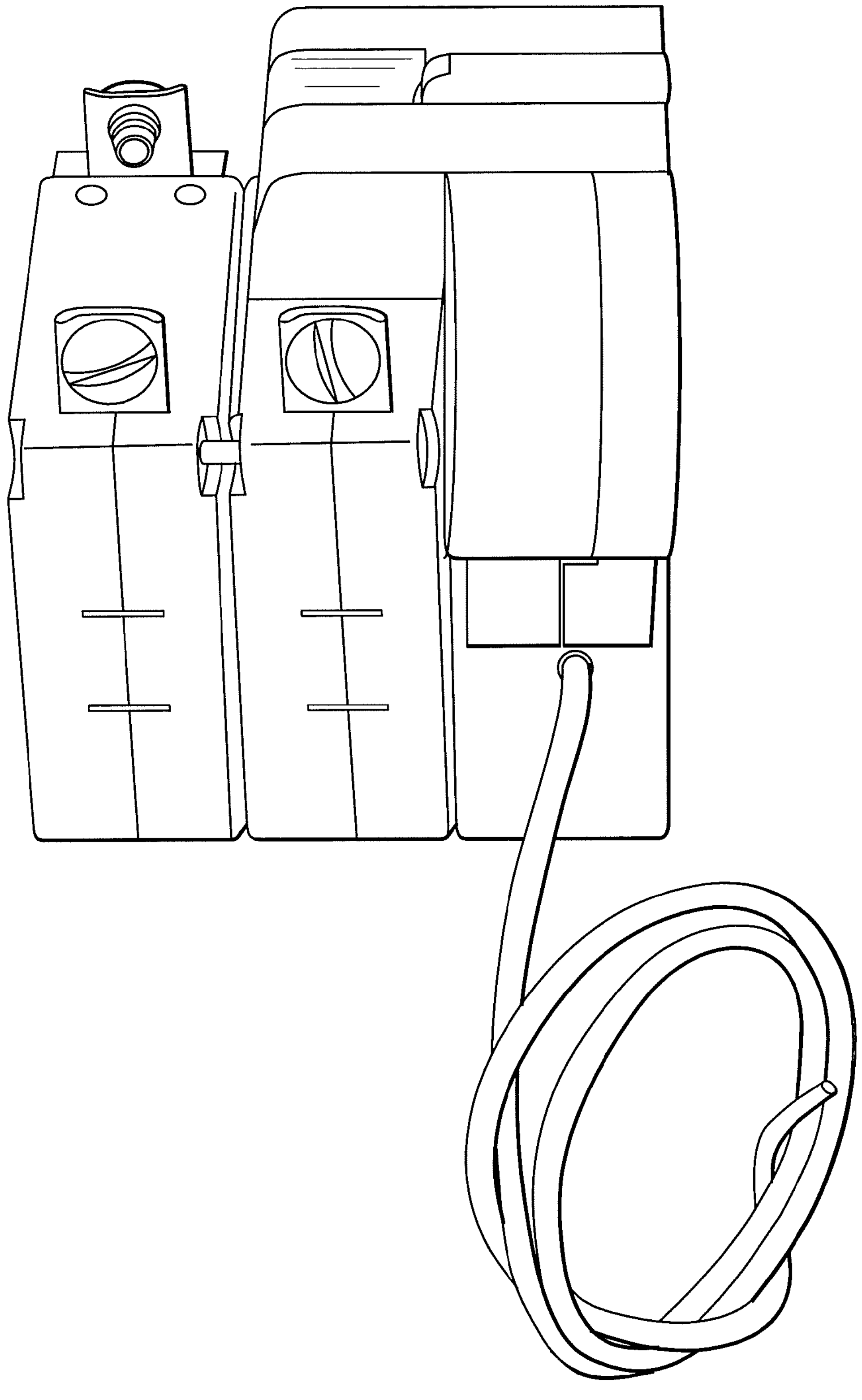
FIG. 5C is a perspective view of a magnetic circuit breaker with overcurrent and ground fault actuation according to the embodiment of FIG. 5.
Figure 5D:
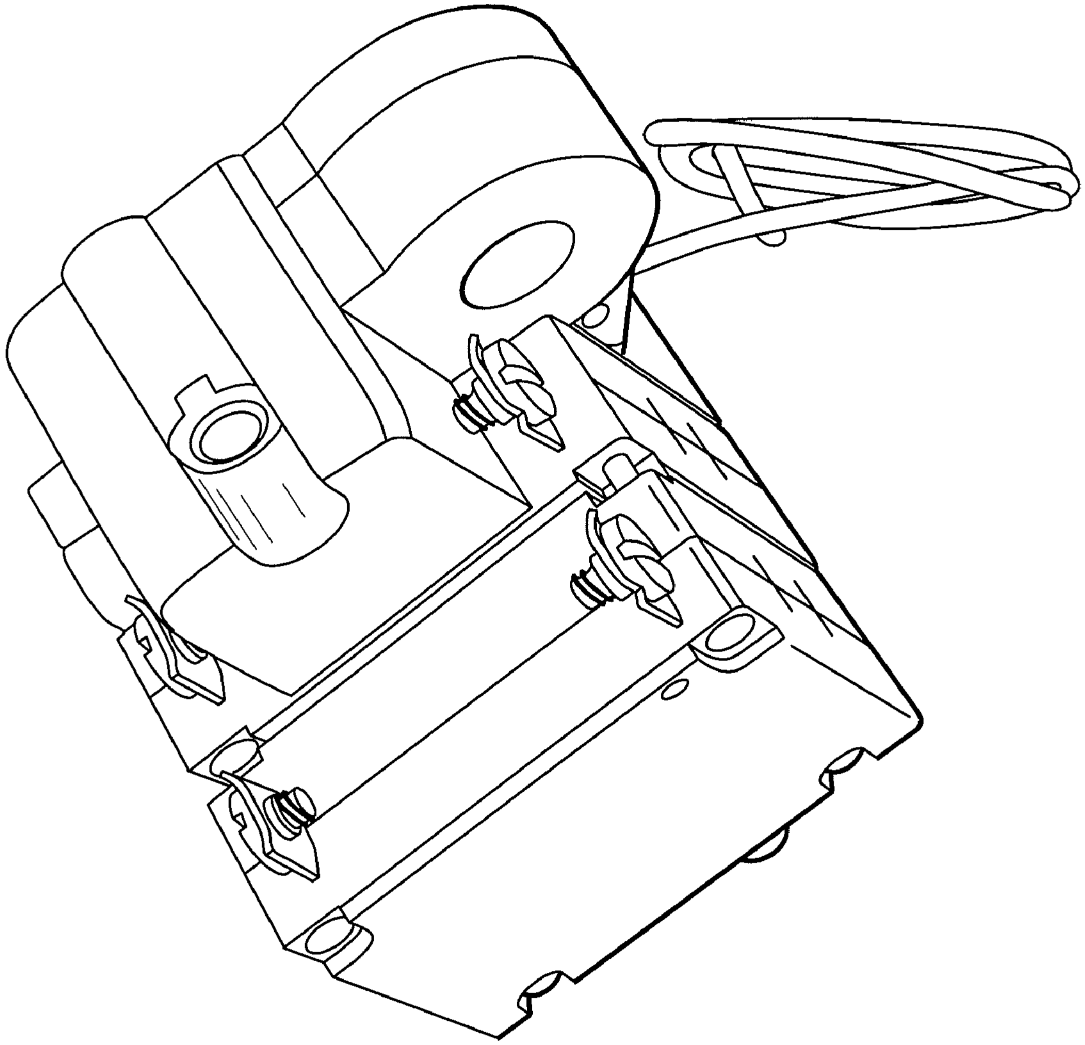
FIG. 5D is a perspective view of a magnetic circuit breaker with overcurrent and ground fault actuation according to the embodiment of FIG. 5.

By comparing FIG. 4 to FIG. 5, two different embodiments are easily seen. First in FIG. 4, it is seen that two sets of terminals 38 and 42 are included in the 2 pole breaker version as shown. In contrast, in FIG. 5, the second pole is internally connected to the first pole via any convenient means. For example, a connecting rod actuator (not shown) may simply physically trip the second pole breaker when the first pole breaker is tripped, thereby eliminating wiring. FIGS. 5A-5D show additional views and embodiments of a multipole circuit breaker in which the second pole is internally connected to the first pole.

Thus, it is envisioned that any number of poles or breakers may be connected depending upon the desired application and thus this application is not limited to single or double pole breaker applications per se.

While FIGS. 3-5D illustrate embodiments using a toggle lever actuator, it will be readily apparent to one skilled in the art that other types of actuators can be used in place of the toggle lever actuator. For example, push button actuators and rocker switch actuators can also be used, as well as other types of applicable actuators.

Figure 7:
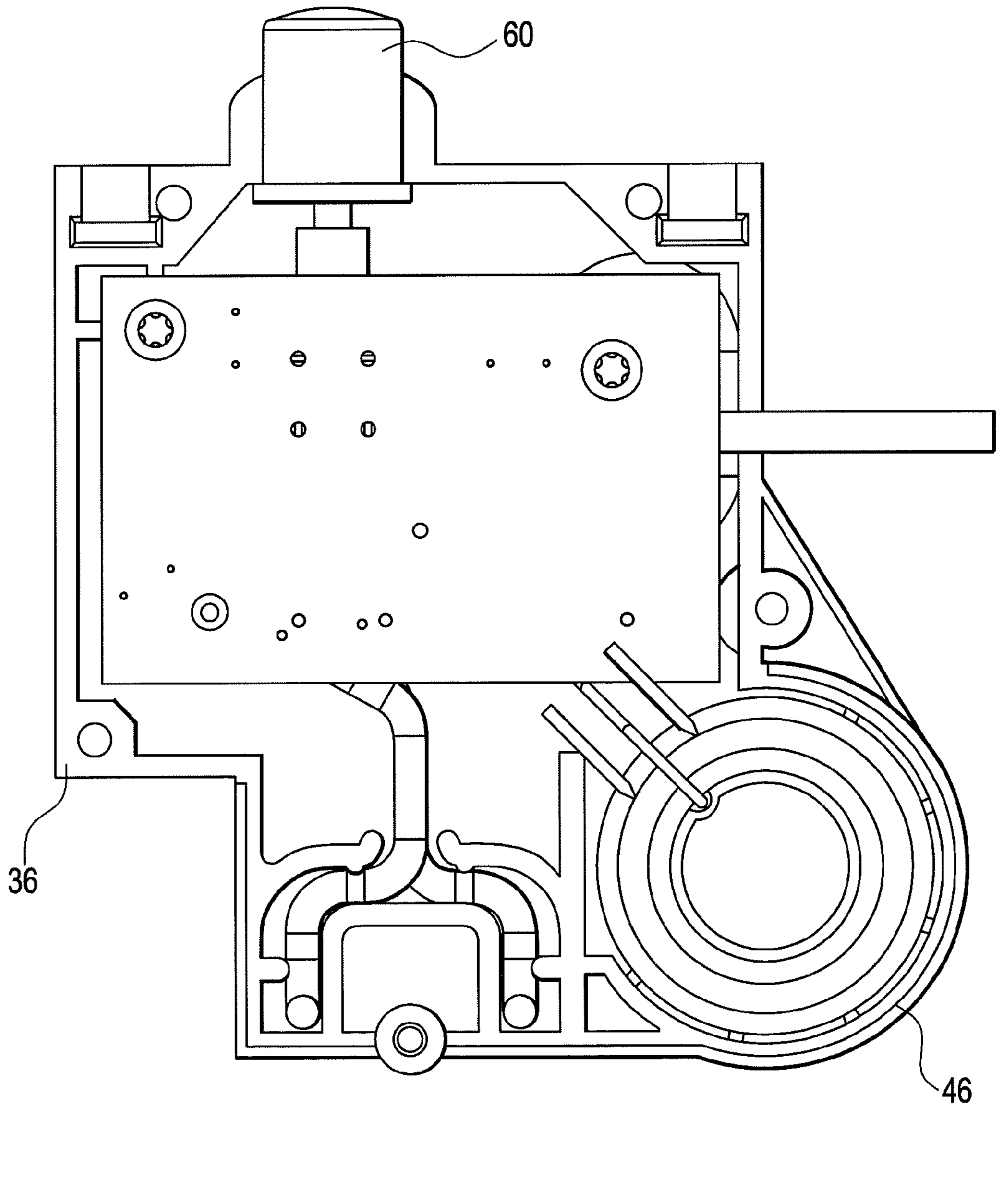
FIG. 7 is a side view of one embodiment of a GFCI module with a test button.
Figure 8:
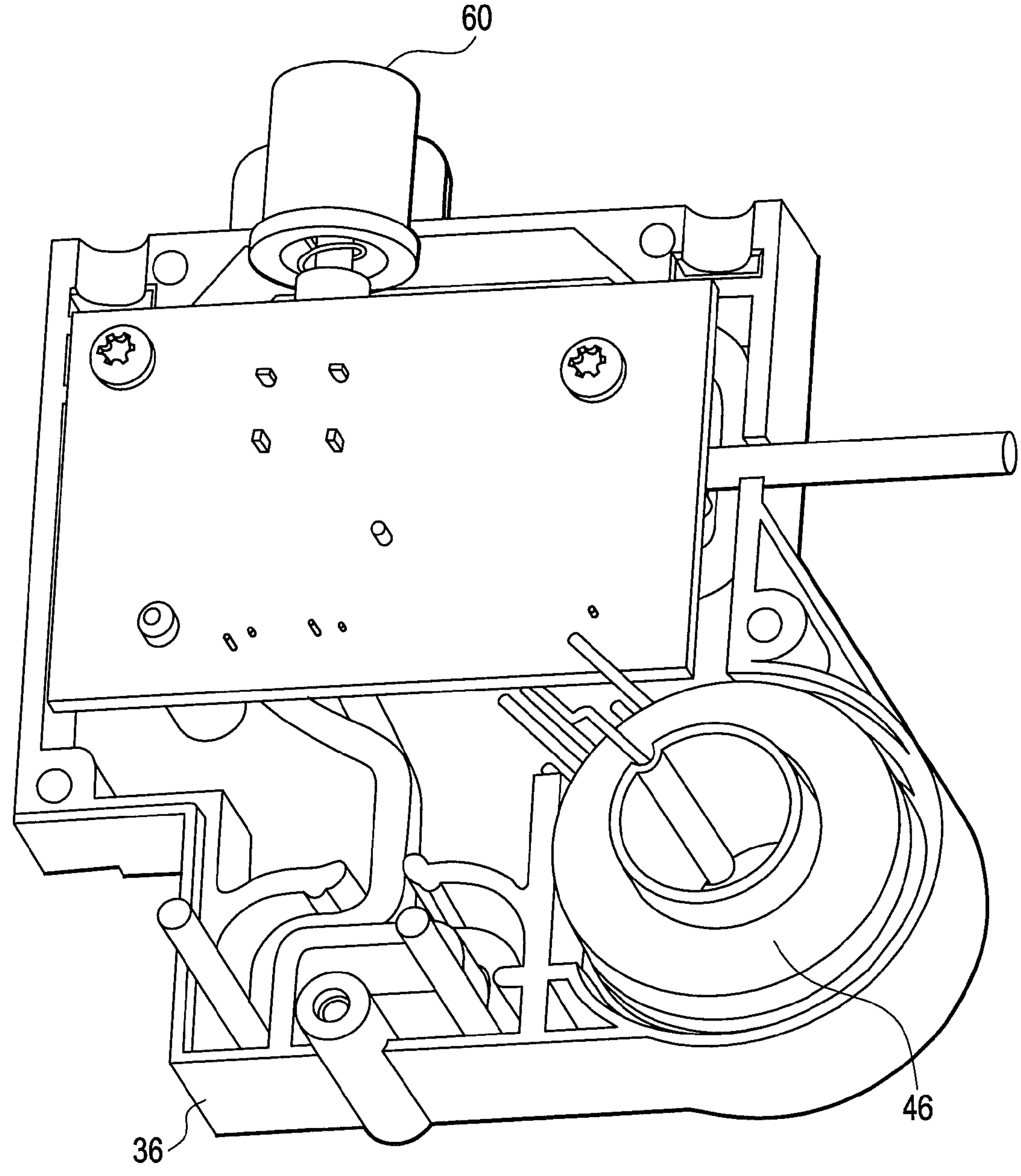
FIG. 8 is a perspective view of the interior of one embodiment of a GFCI module with a test button.
Figure 9:
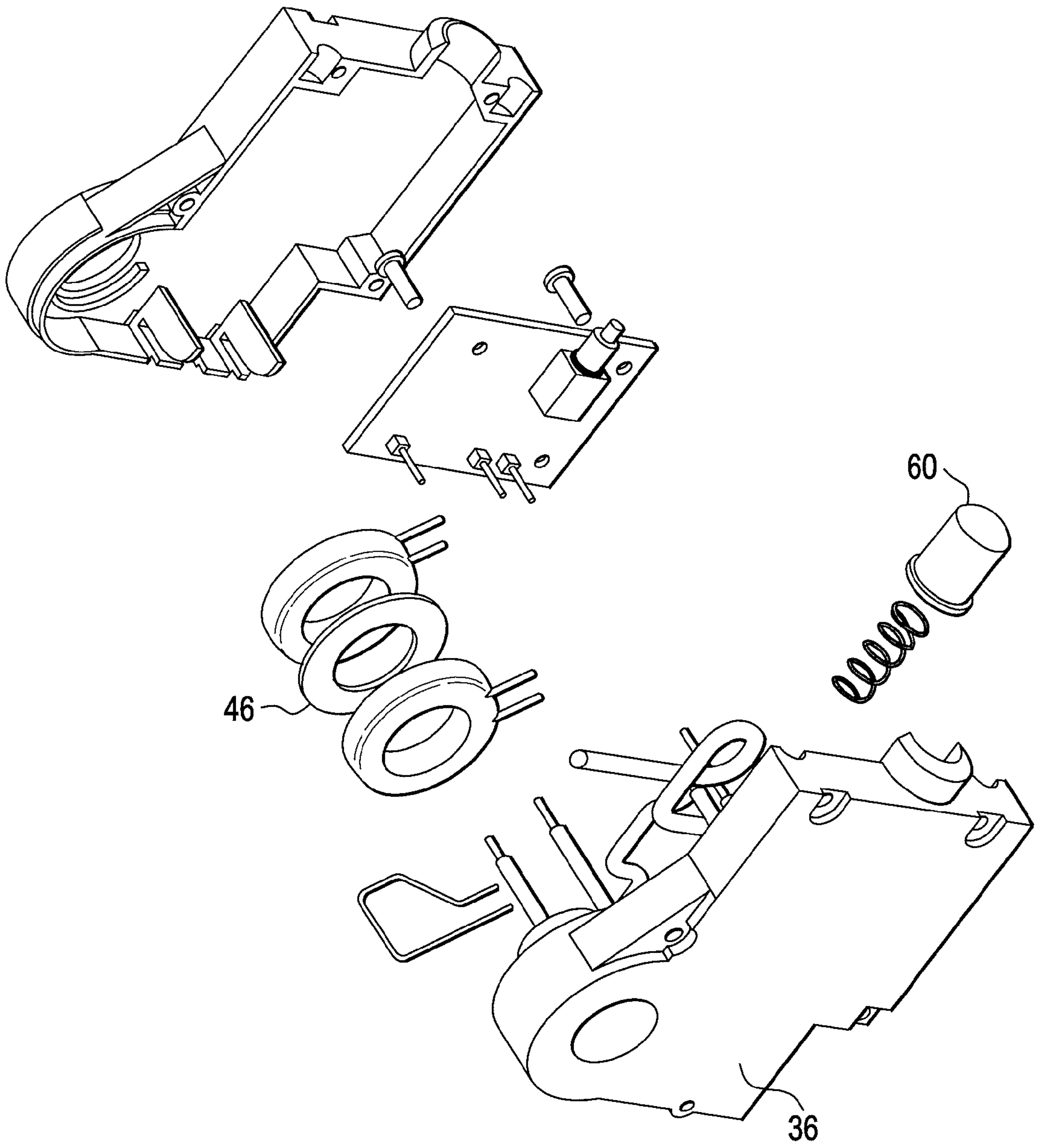
FIG. 9 is an exploded perspective view of one embodiment of a GFCI module with a test button.
Figure 10:
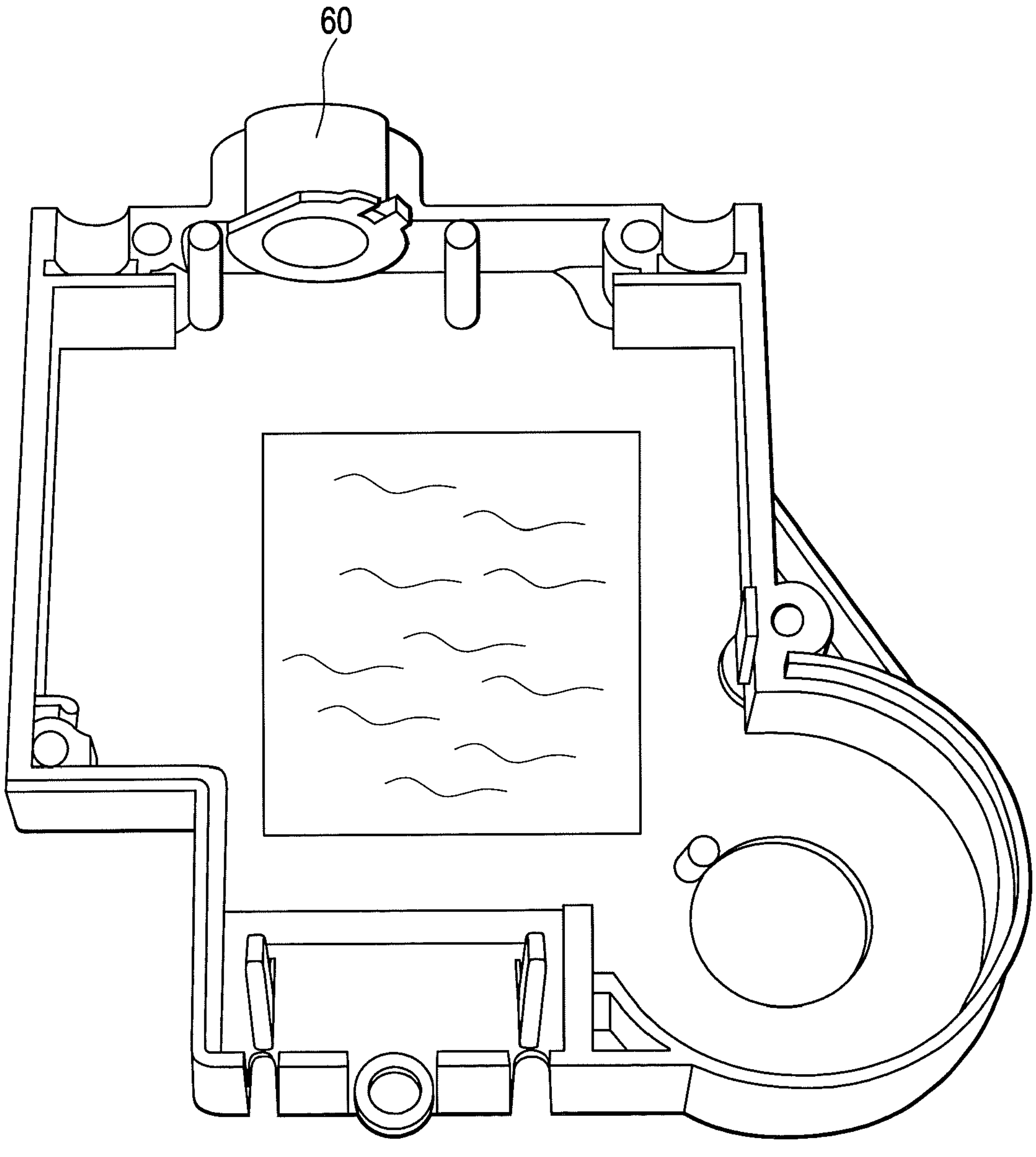
FIG. 10 is a perspective view of the interior of one embodiment of a GFCI module with a test button.
Figure 11:
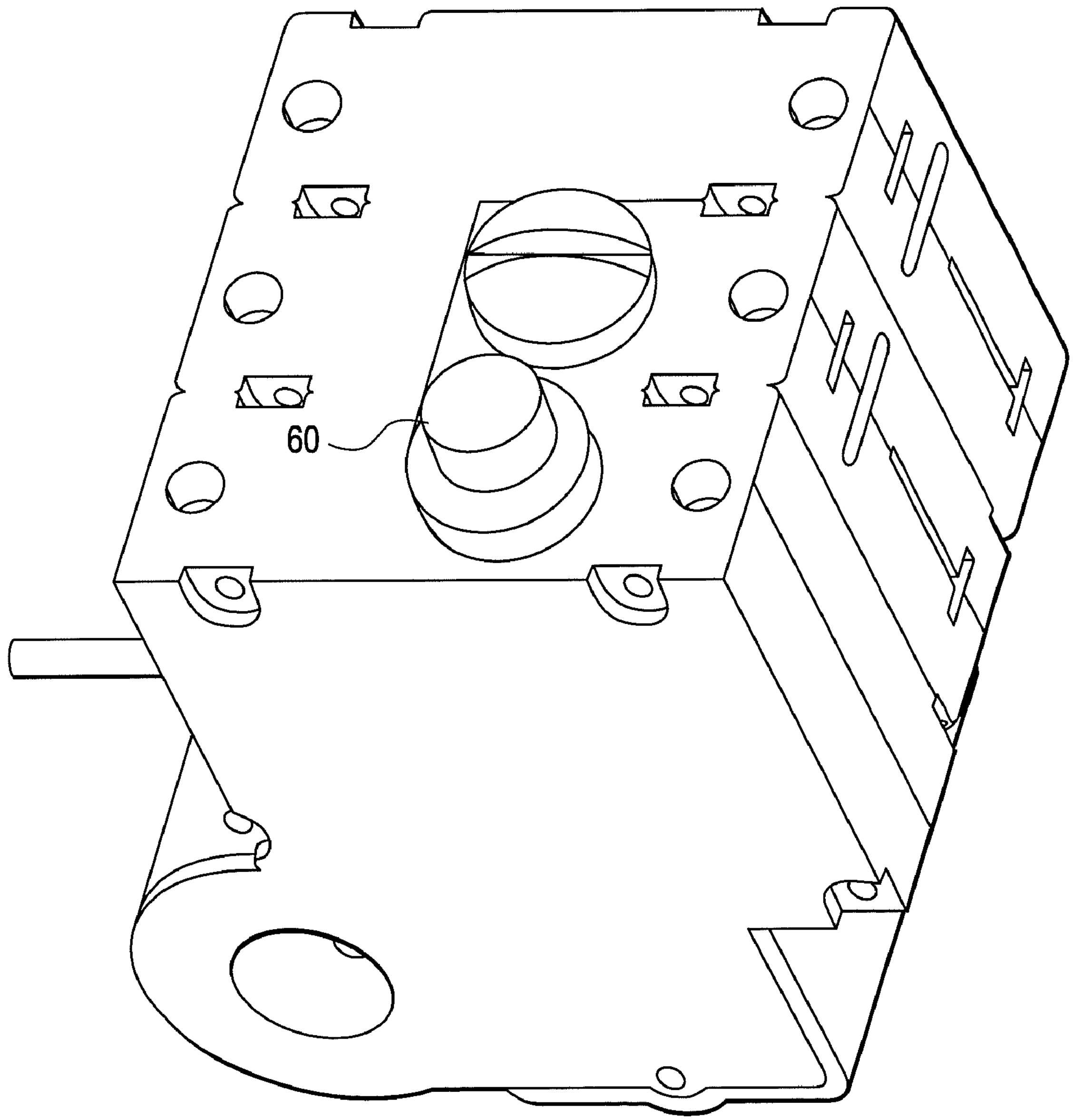
FIG. 11 is a perspective view of one embodiment of a GFCI module with a test button.
Figure 12:
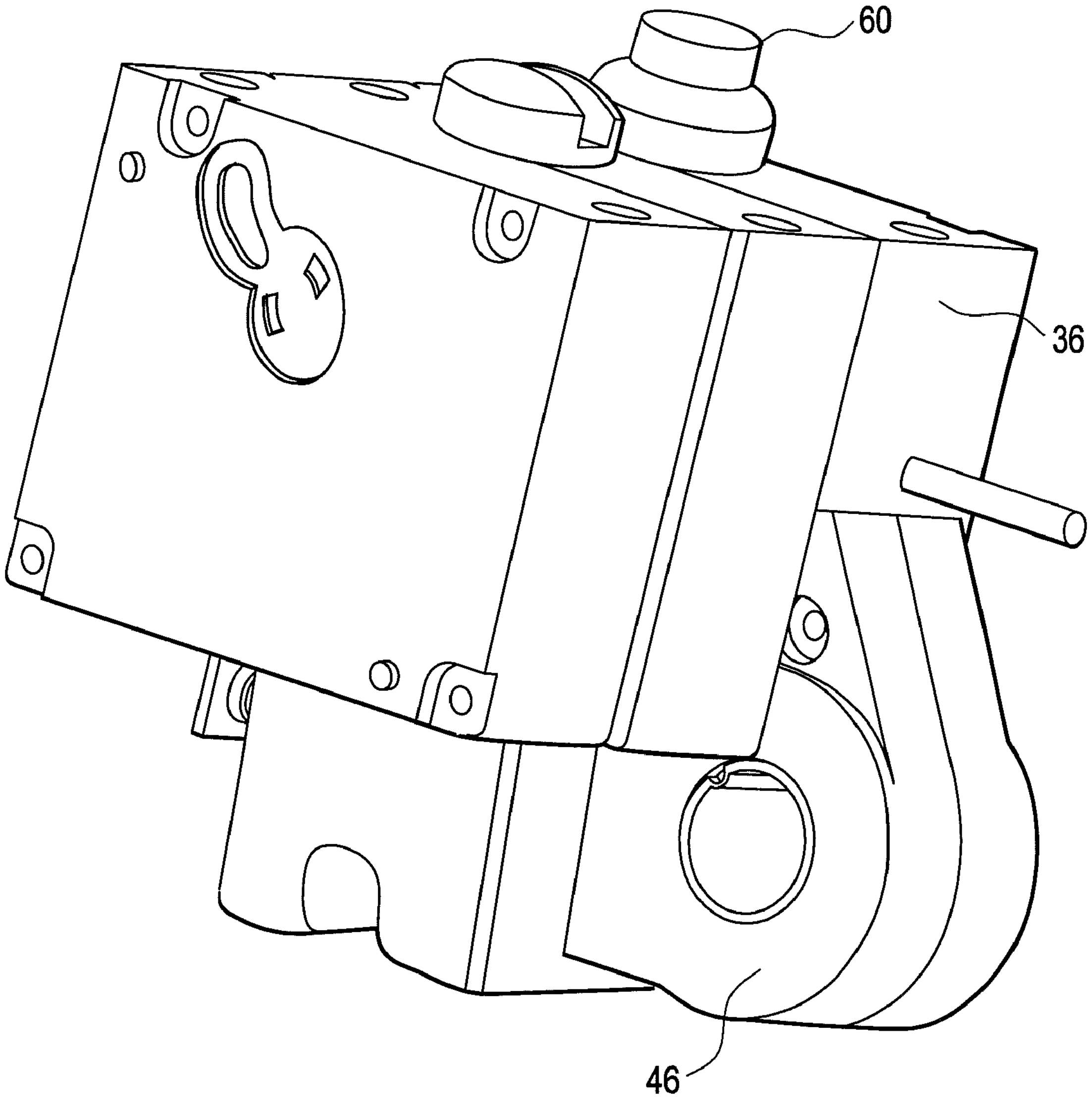
FIG. 12 is a perspective view of one embodiment of a GFCI module with a test button.
Figure 13:
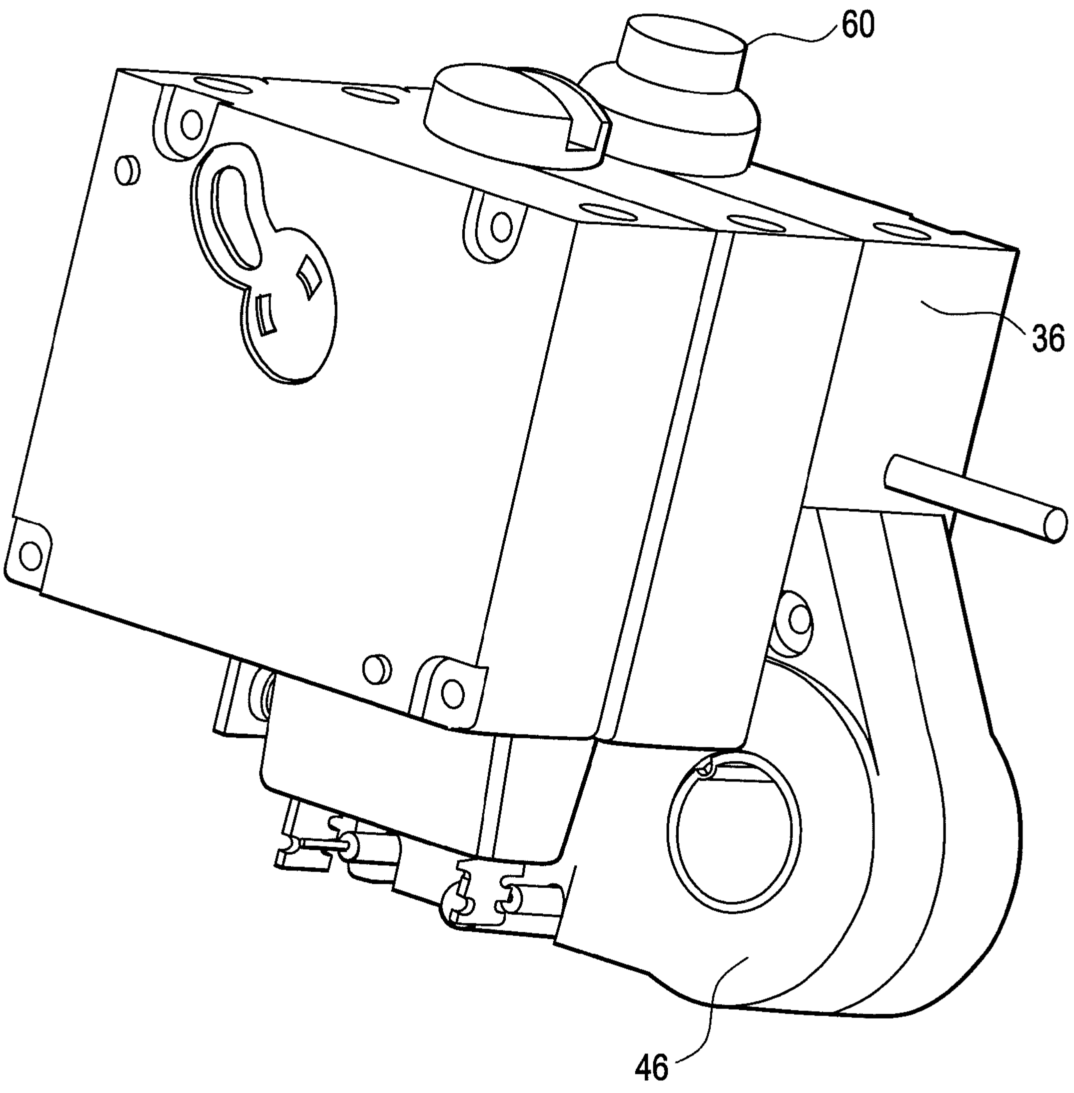
FIG. 13 is a perspective view of one embodiment of a GFCI module with a test button.
Figure 14:
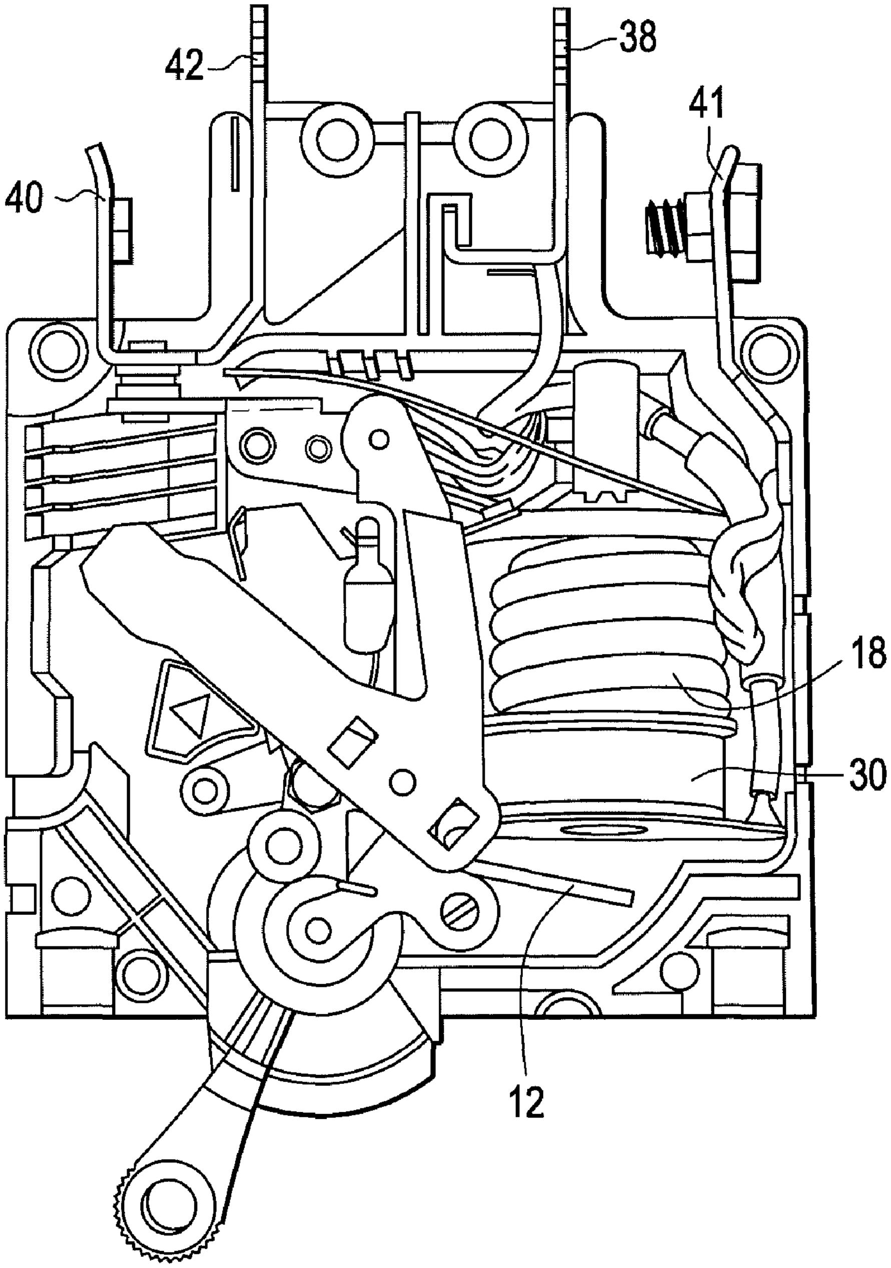
FIG. 14 is an interior view of a magnetic circuit breaker with overcurrent and ground fault actuation according to an embodiment.
Figure 15:
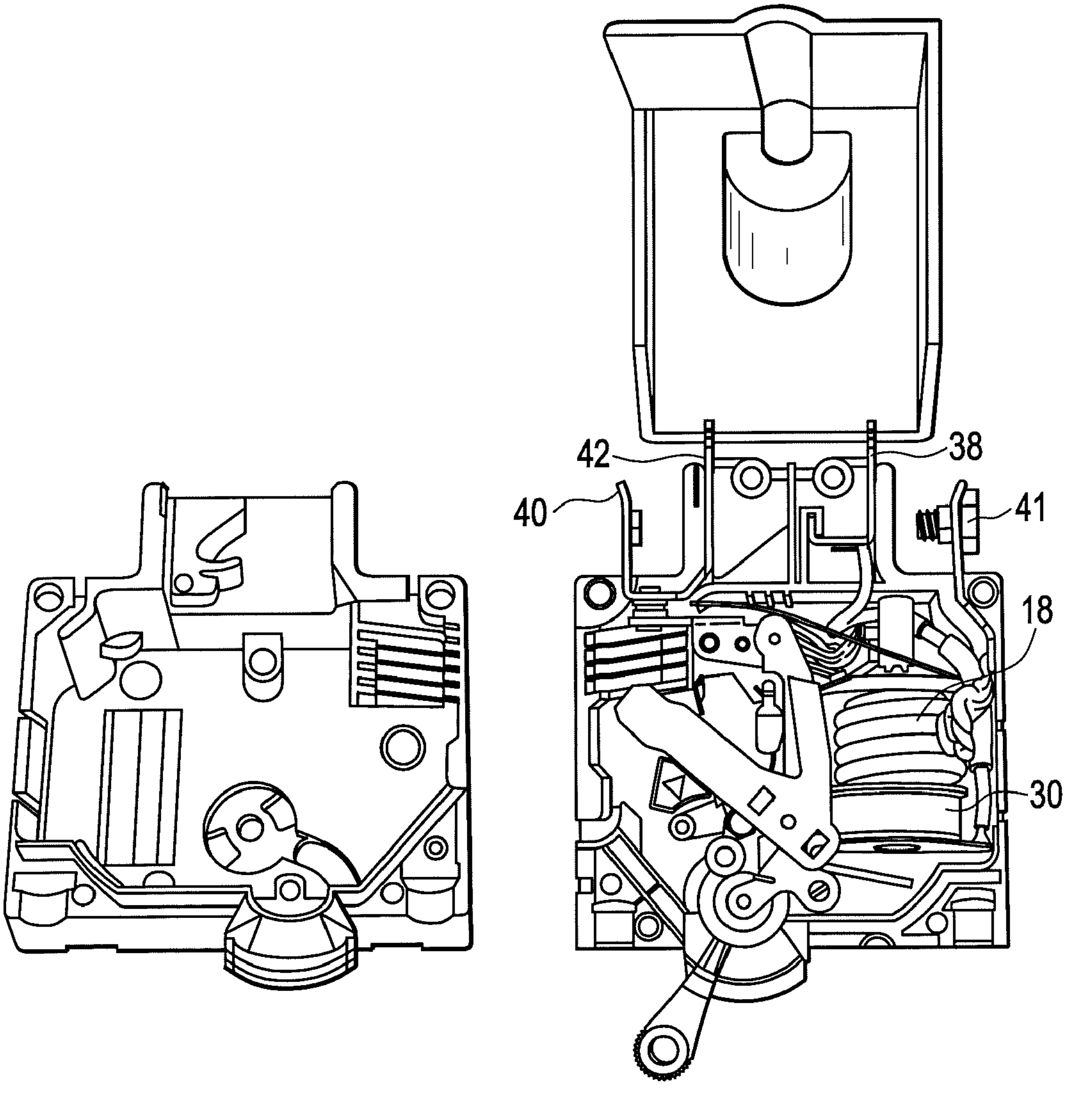
FIG. 15 is an interior view of a magnetic circuit breaker with overcurrent and ground fault actuation according to an embodiment.
Figure 16:
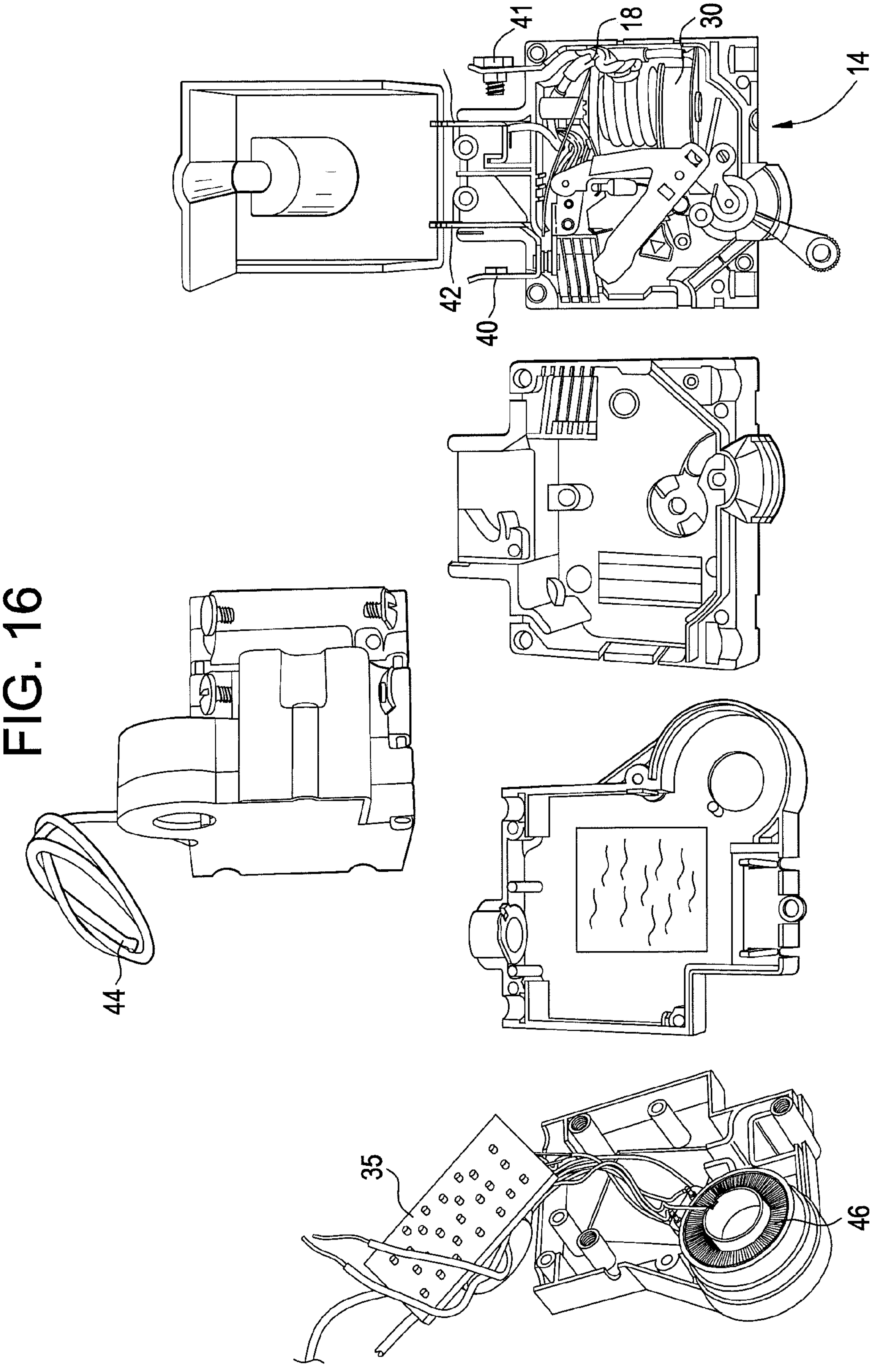
FIG. 16 is an interior view of a magnetic circuit breaker with overcurrent and ground fault actuation and a GFCI module with a test button according to an embodiment.
Figure 17:
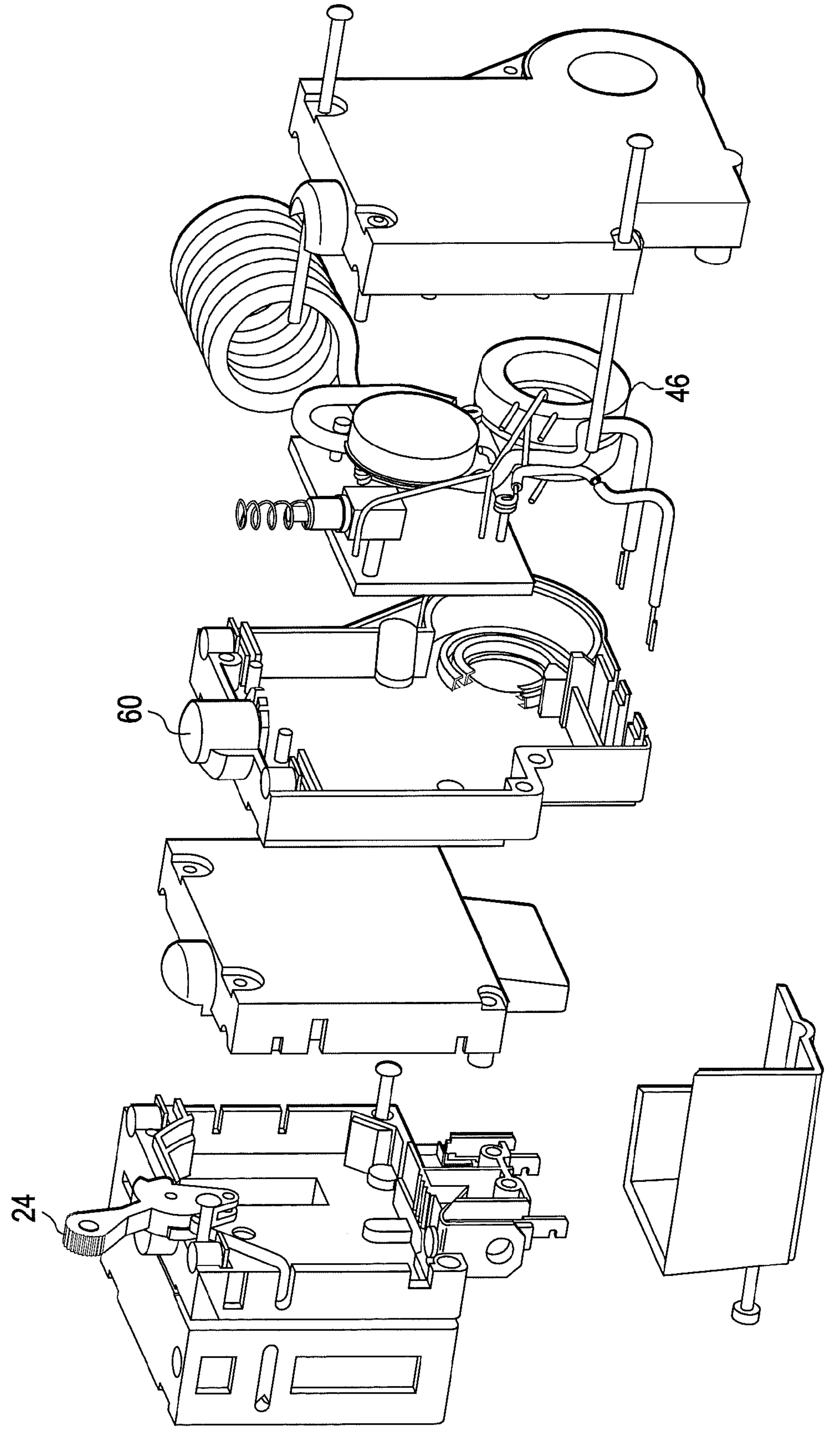
FIG. 17 is an exploded view of a magnetic circuit breaker with overcurrent and ground fault actuation and a GFCI module with a test button according to an embodiment.
Figure 18:
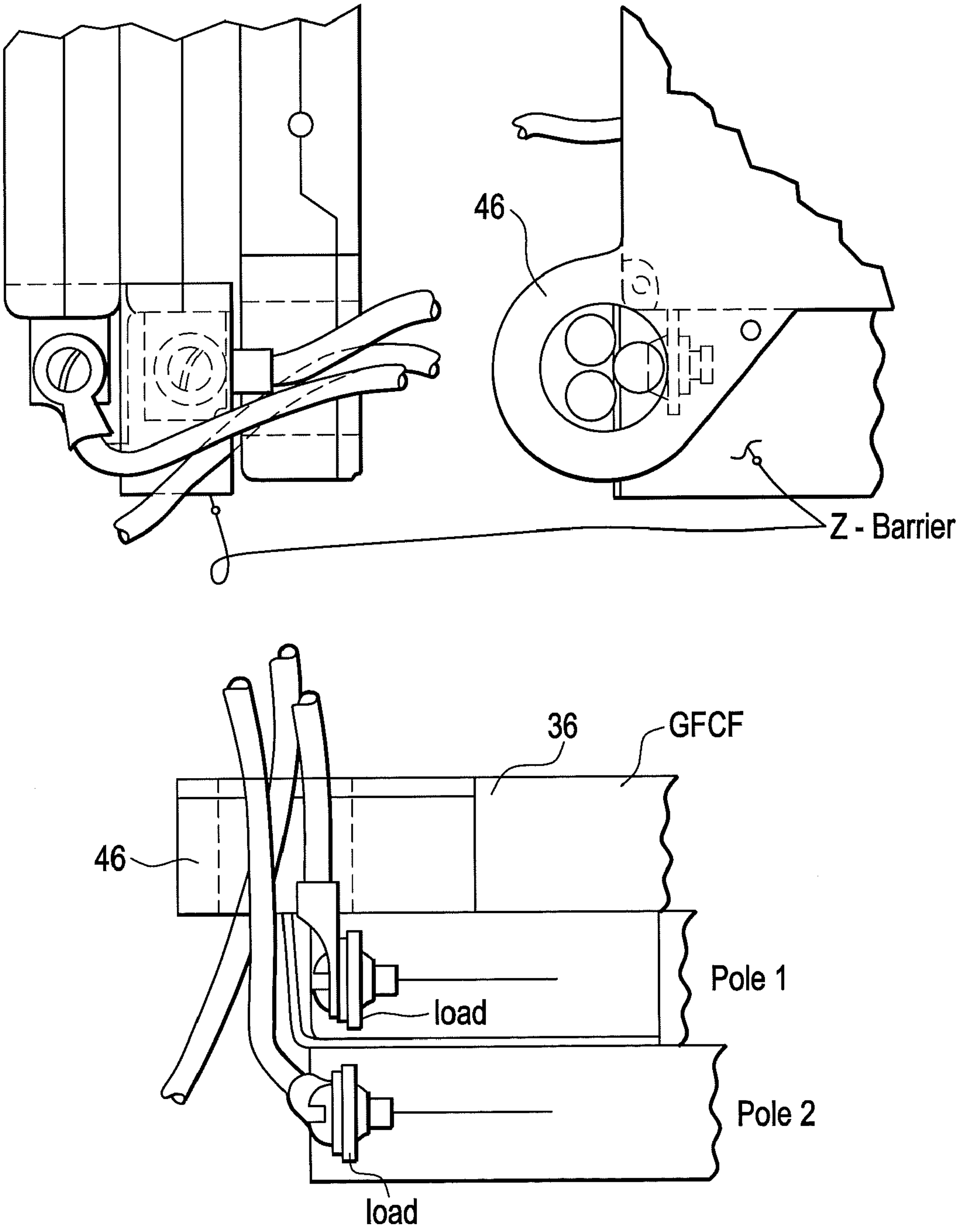
FIG. 18 shows various views of a magnetic circuit breaker with overcurrent and ground fault actuation according to an embodiment.

FIG. 7 shows one embodiment of the GFCI module 36 that includes a test button 60. When test button 60 is pressed, it simulates a ground fault condition in the circuit. If the ground fault detection circuitry is operating properly, the circuit breaker will trip. The circuit breaker can be reset by moving the toggle level actuator back to the on position. FIGS. 8-13 show additional embodiments of a GFCI module 36 with a test button 60.

FIGS. 14 through 18 show additional views and embodiments of a circuit breaker with overcurrent and ground fault protection.

Additionally, a circuit breaker apparatus according to at least an embodiment of the present invention may implement a number of different actuator mechanisms, as seen in FIGS. 19-30. It will be understood that each of the devices shown in FIGS. 19-30 may contain similar structure and electronics as described above, which may not be fully illustrated in FIGS. 19-30. Instead, the views shown in FIGS. 19-30 are meant to focus on the actuator for the particular device shown.

Figure 19:
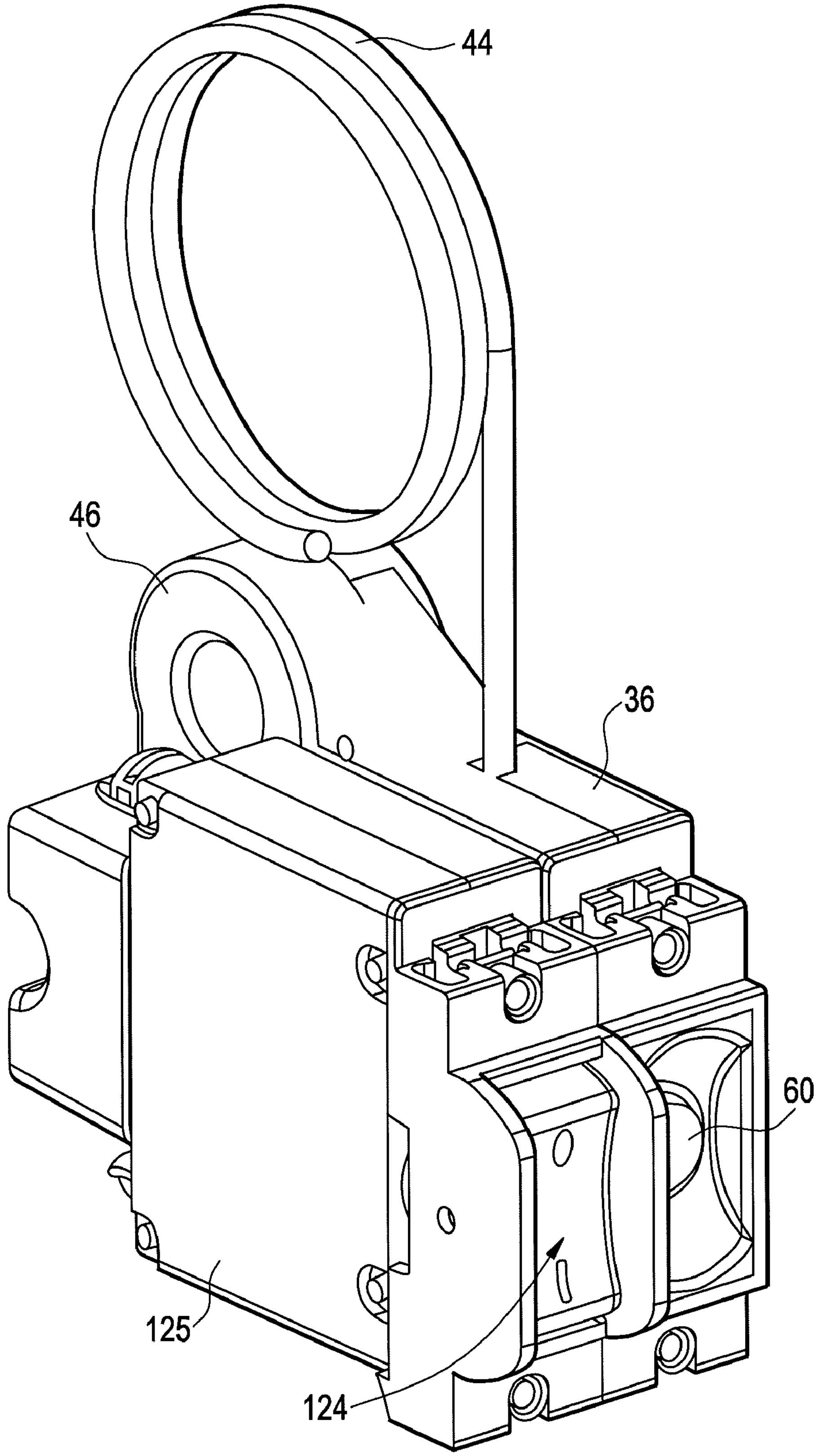
FIG. 19 shows a perspective view of a circuit breaker apparatus with a rocker actuator according to at least an embodiment.
Figure 20:
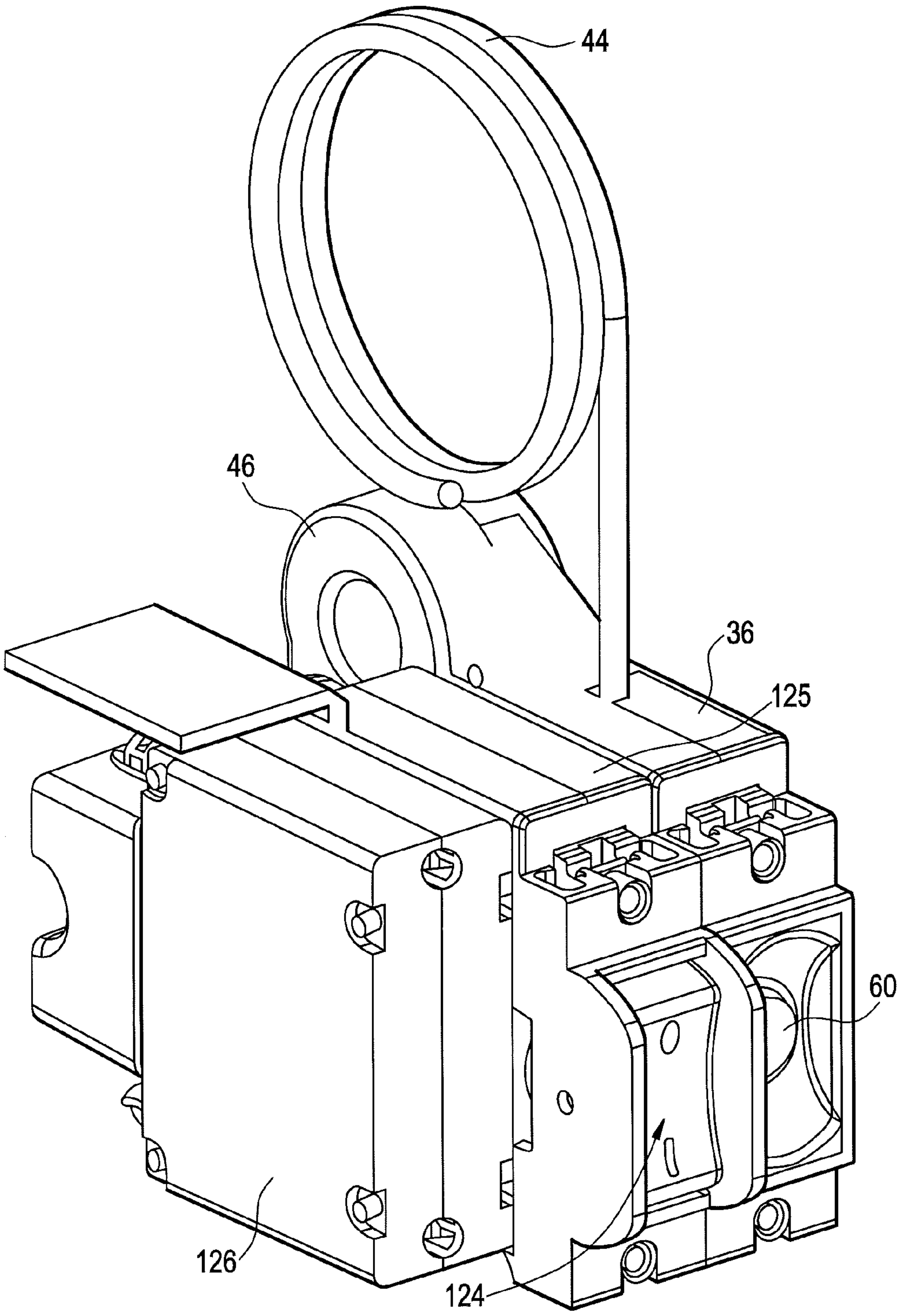
FIG. 20 shows a perspective view of a circuit breaker apparatus with a rocker actuator according to at least an embodiment.
Figure 21:
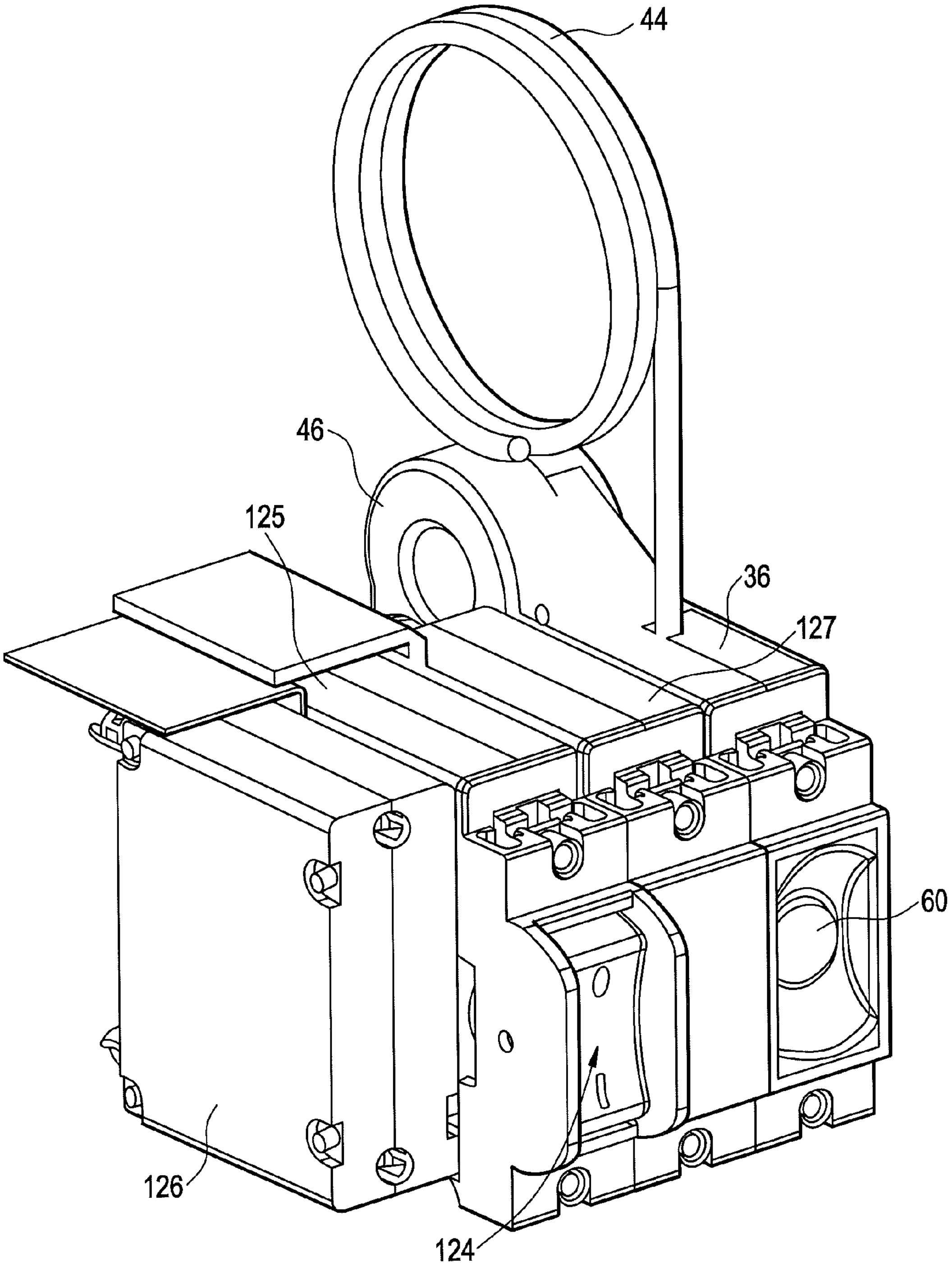
FIG. 21 shows a perspective view of a circuit breaker apparatus with a rocker actuator according to at least an embodiment.

For example, FIGS. 19-21 illustrate devices uses a rocker actuator 124. Rocker actuator 124 can toggle between at least a first position and at least a second position. For example, the first position may correspond to an "on" position, and the second position may correspond to an "off" position. FIGS. 19-21 also show various different applications of at least an embodiment of the device, such as a one-pole application (FIG. 19), a two pole application (FIG. 20), and a three pole application (FIG. 21). In the one pole application, a single breaker 125 or circuit breaker module is provided. In a two pole application, an additional breaker 126 or circuit breaker module is provided. In a three pole application, a third breaker 127 or circuit breaker module is provided. These examples are meant for illustration only, and it will be understood that the device is not limited to one, two, or three pole applications, but that any number of poles can be used.

Figure 22:
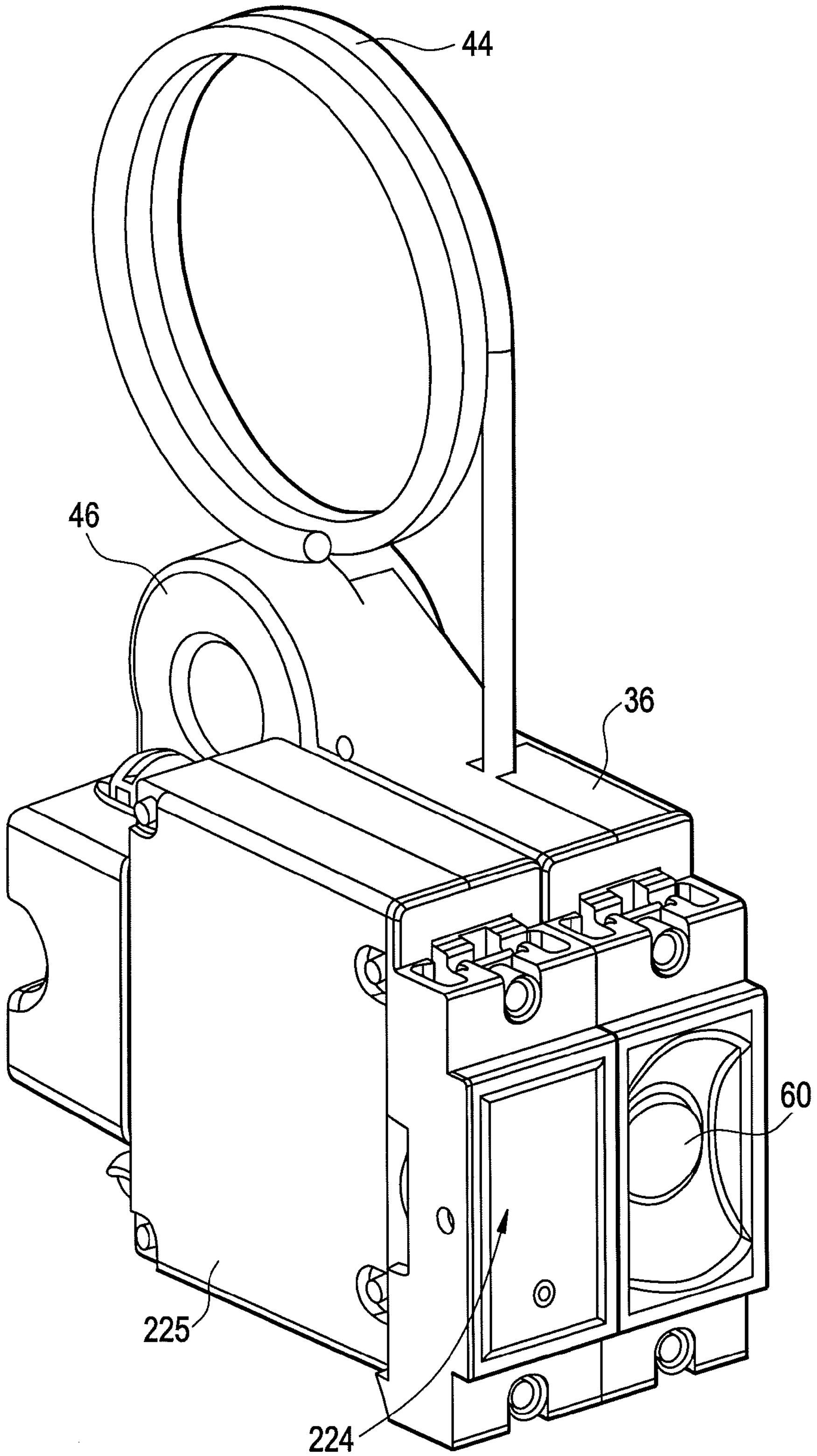
FIG. 22 shows a perspective view of a circuit breaker apparatus with a flat rocker actuator according to at least embodiment.
Figure 23:
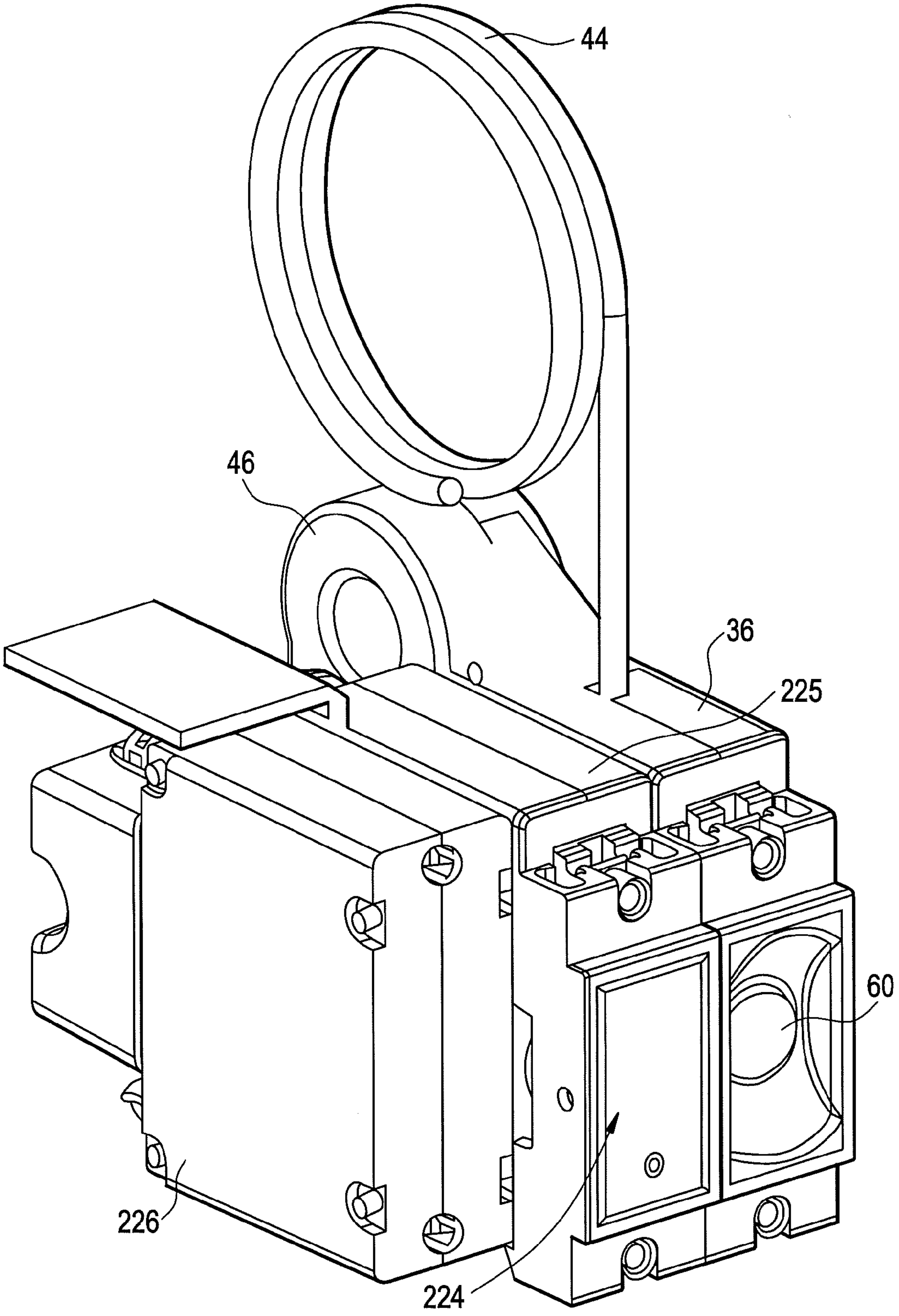
FIG. 23 shows a perspective view of a circuit breaker apparatus with a flat rocker actuator according to at least embodiment.
Figure 24:
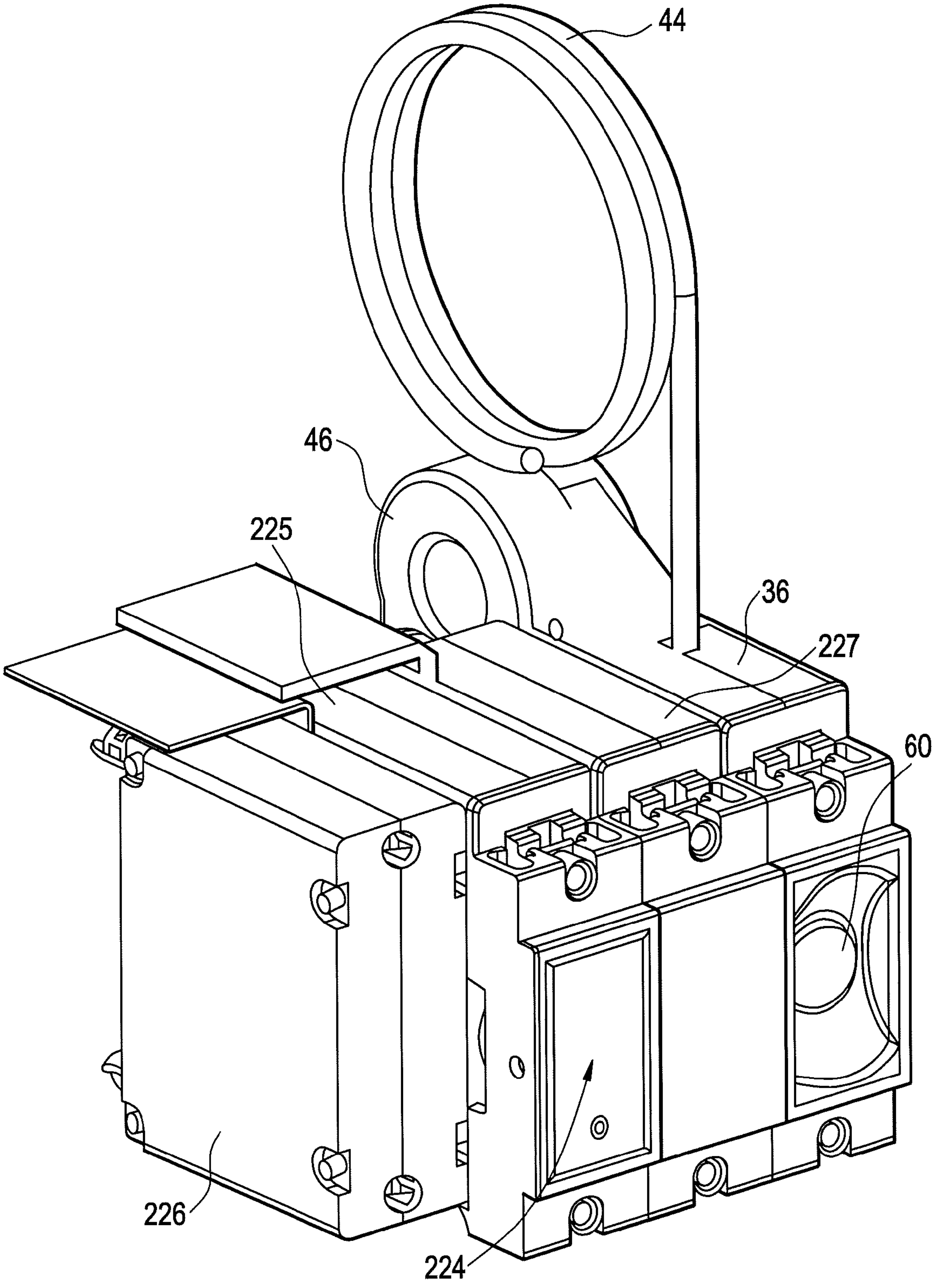
FIG. 24 shows a perspective view of a circuit breaker apparatus with a flat rocker actuator according to at least embodiment.

FIGS. 22-24 illustrate a different possible configuration of a rocker actuator, specifically a flat rocker actuator 224. Similar to the rocker actuator 124 of FIGS. 19-21, flat rocker actuator 224 can also toggle between at least a first position and a second position. However, flat rocker actuator 224 has an added feature in that when flat rocker actuator 224 is in a first position, the flat rocker actuator 224 is flush with a surface of the circuit breaker apparatus.

This structure seen in FIGS. 22-24 is important because it helps to prevent accidental or inadvertent actuation of the flat rocker actuator 224. For example, if the circuit breaker apparatus is configured so that flat rocker actuator 224 is flush with the surface when in the "on" position, it will be appreciated that the flush position of the flat rocker actuator helps to prevent a finger, or tool, or other implement from accidentally pushing against flat rocker actuator and turning off the circuit breaker apparatus. Instead, the flush position of flat rocker actuator 224 allows tools, fingers, or other implements to simply slide over the surface of the circuit breaker apparatus without toggling the actuator. This is an especially important safety feature when the circuit breaker apparatus is connected to an essential system, which may result in a safety hazard for example if the essential system is accidentally turned off.

Additionally, FIGS. 22-24 also show various different applications of at least an embodiment of the device, such as a one-pole application (FIG. 22), a two pole application (FIG. 23), and a three pole application (FIG. 24). In the one pole application, a single breaker 225 or circuit breaker module is provided. In a two pole application, an additional breaker 226 or circuit breaker module is provided. In a three pole application, a third breaker 227 or circuit breaker module is provided. These examples are meant for illustration only, and it will be understood that the device is not limited to one, two, or three pole applications, but that any number of poles can be used.

Figure 28:
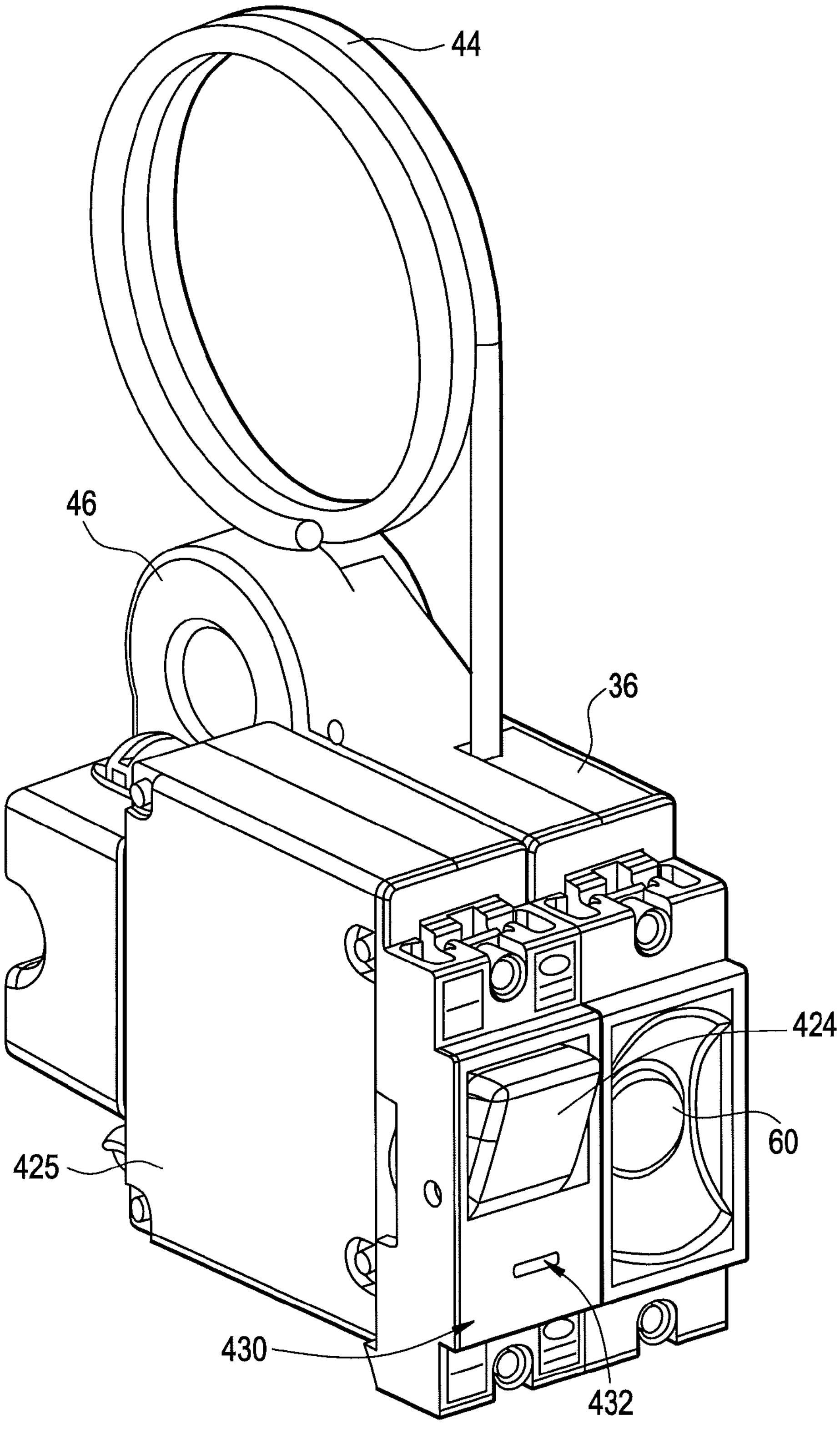
FIG. 28 shows a perspective view of a circuit breaker apparatus with a flat rocker actuator and an actuator cover according to at least an embodiment.
Figure 29:
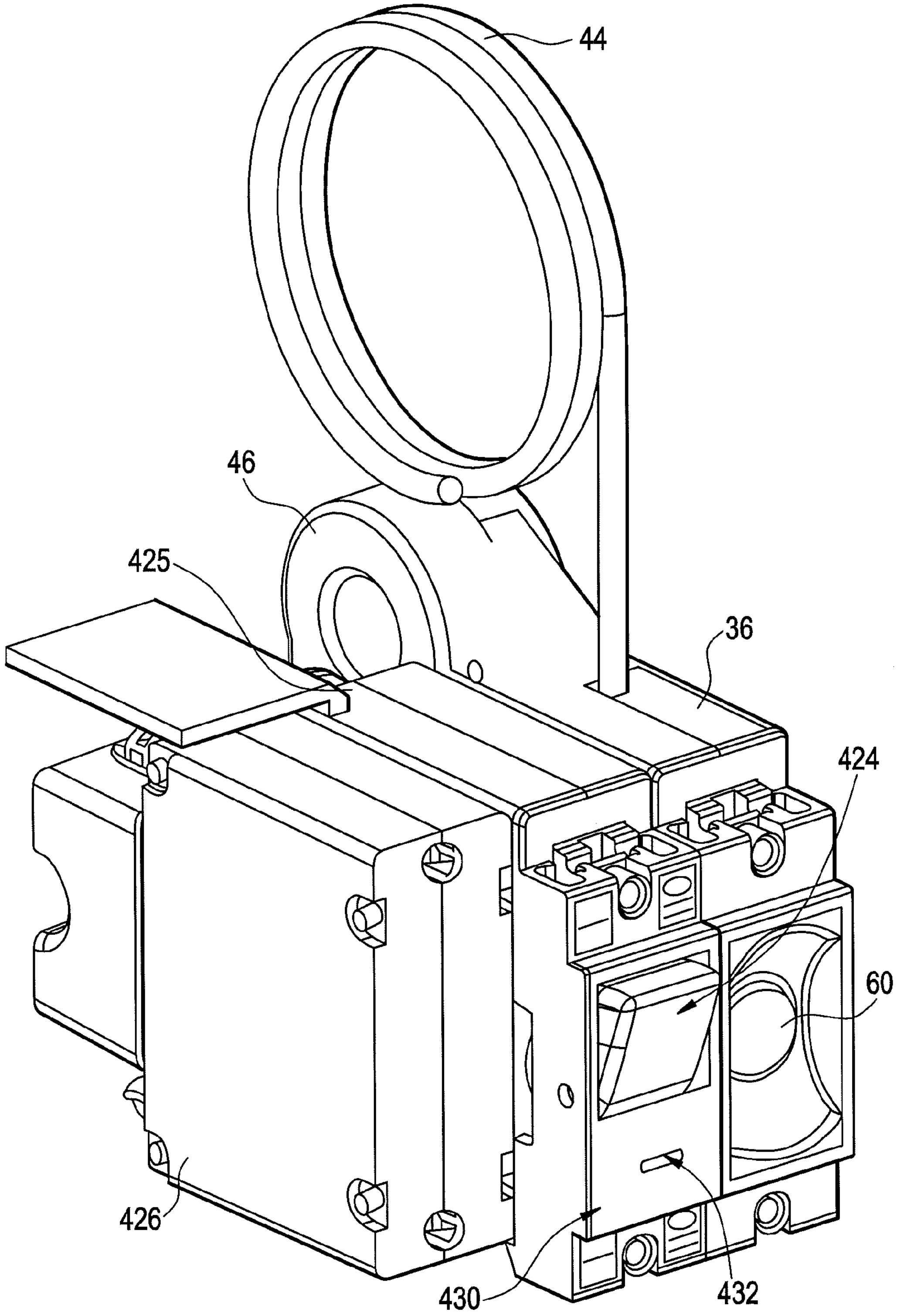
FIG. 29 shows a perspective view of a circuit breaker apparatus with a flat rocker actuator and an actuator cover according to at least an embodiment.
Figure 30:
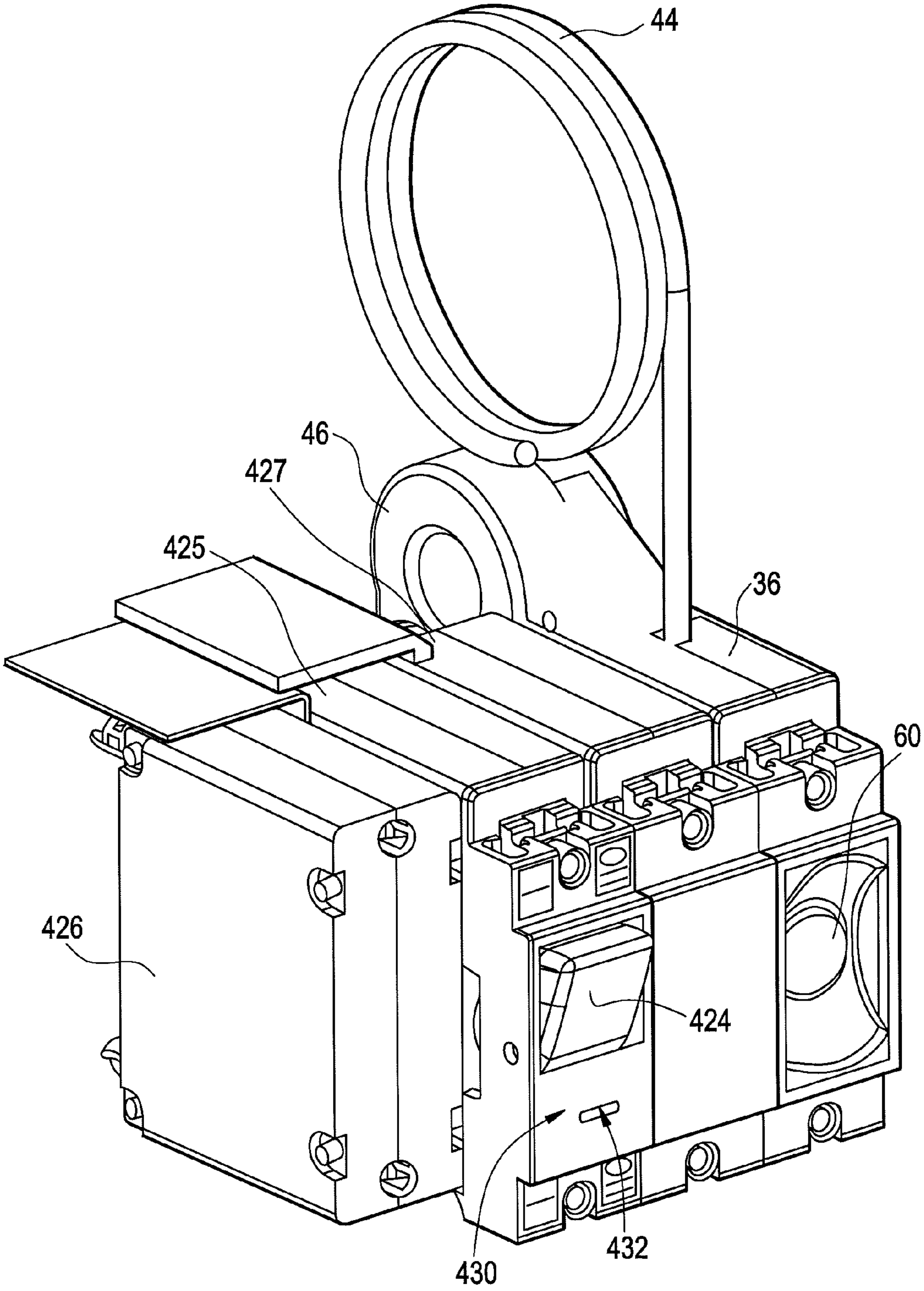
FIG. 30 shows a perspective view of a circuit breaker apparatus with a flat rocker actuator and an actuator cover according to at least an embodiment.

FIGS. 28-30 show a further modification of the flat rocker actuator described above. For example, flat rocker actuator 424 may be similar to flat rocker actuator 224, i.e., flush with a surface of the circuit breaker apparatus when in a given position. In addition, there may be an actuator cover 430 over at least a part of flat rocker actuator 424. Actuator cover 430 may include a small reset hole 432 formed therein. As noted above, the flat rocker actuator 224 of FIGS. 22-24 may prevent accidental actuation from objects that are sliding along a surface of the circuit breaker apparatus. However, the addition of actuator cover 430 also helps to prevent accidental actuation from an object that is pressing down on the circuit breaker apparatus. Reset hole 432 allows for manual reset by insertion of a tool or other appropriate device when necessary. As noted above, this is an important safety feature to ensure that a circuit or load is not accidentally turned off, which is especially important with system critical loads.

Additionally, FIGS. 28-30 also show various different applications of at least an embodiment of the device, such as a one-pole application (FIG. 28), a two pole application (FIG. 29), and a three pole application (FIG. 30). In the one pole application, a single breaker 425 or circuit breaker module is provided. In a two pole application, an additional breaker 426 or circuit breaker module is provided. In a three pole application, a third breaker 427 or circuit breaker module is provided. These examples are meant for illustration only, and it will be understood that the device is not limited to one, two, or three pole applications, but that any number of poles can be used.

Figure 25:
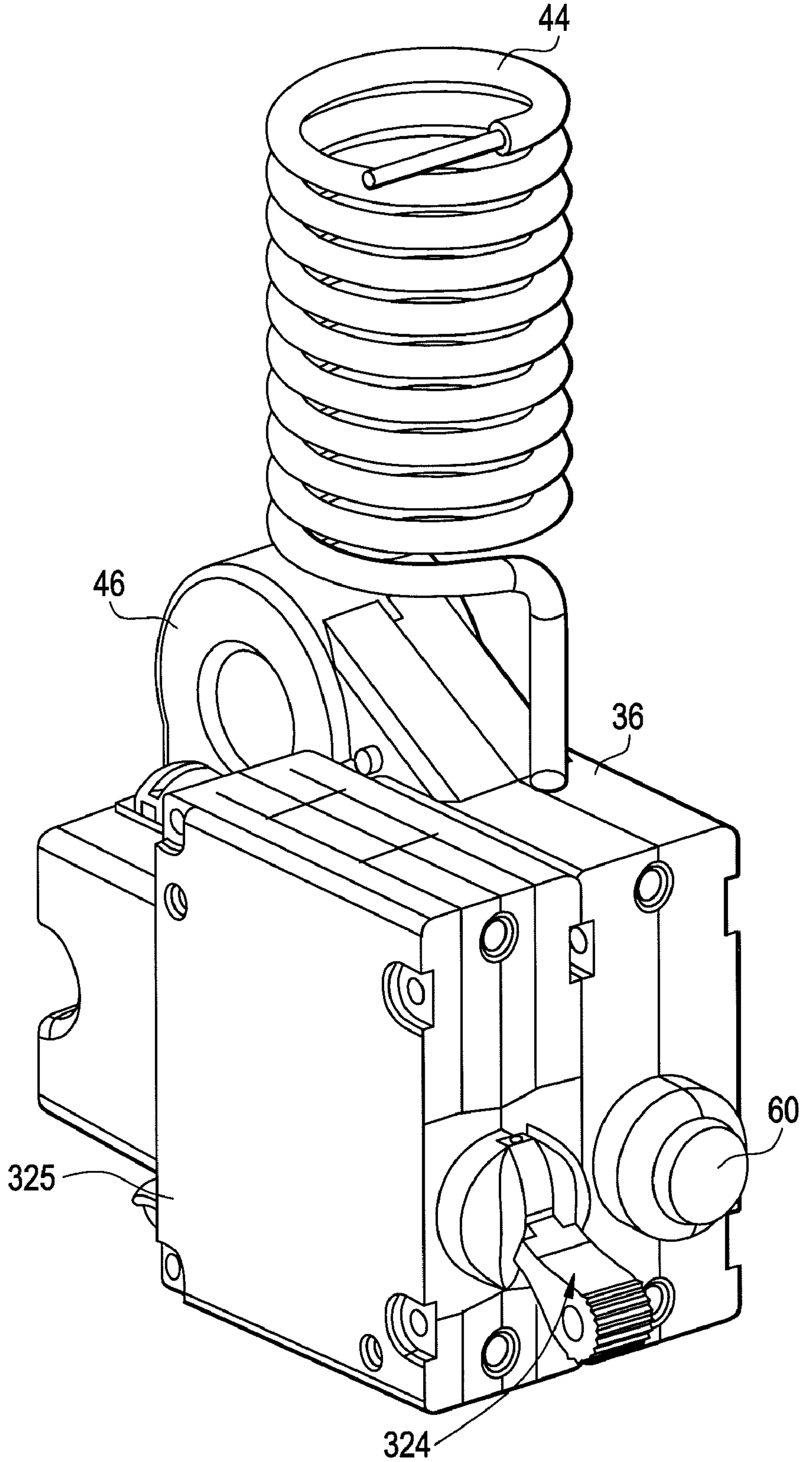
FIG. 25 shows a perspective view of a circuit breaker apparatus with a handle actuator according to at least an embodiment.
Figure 26:
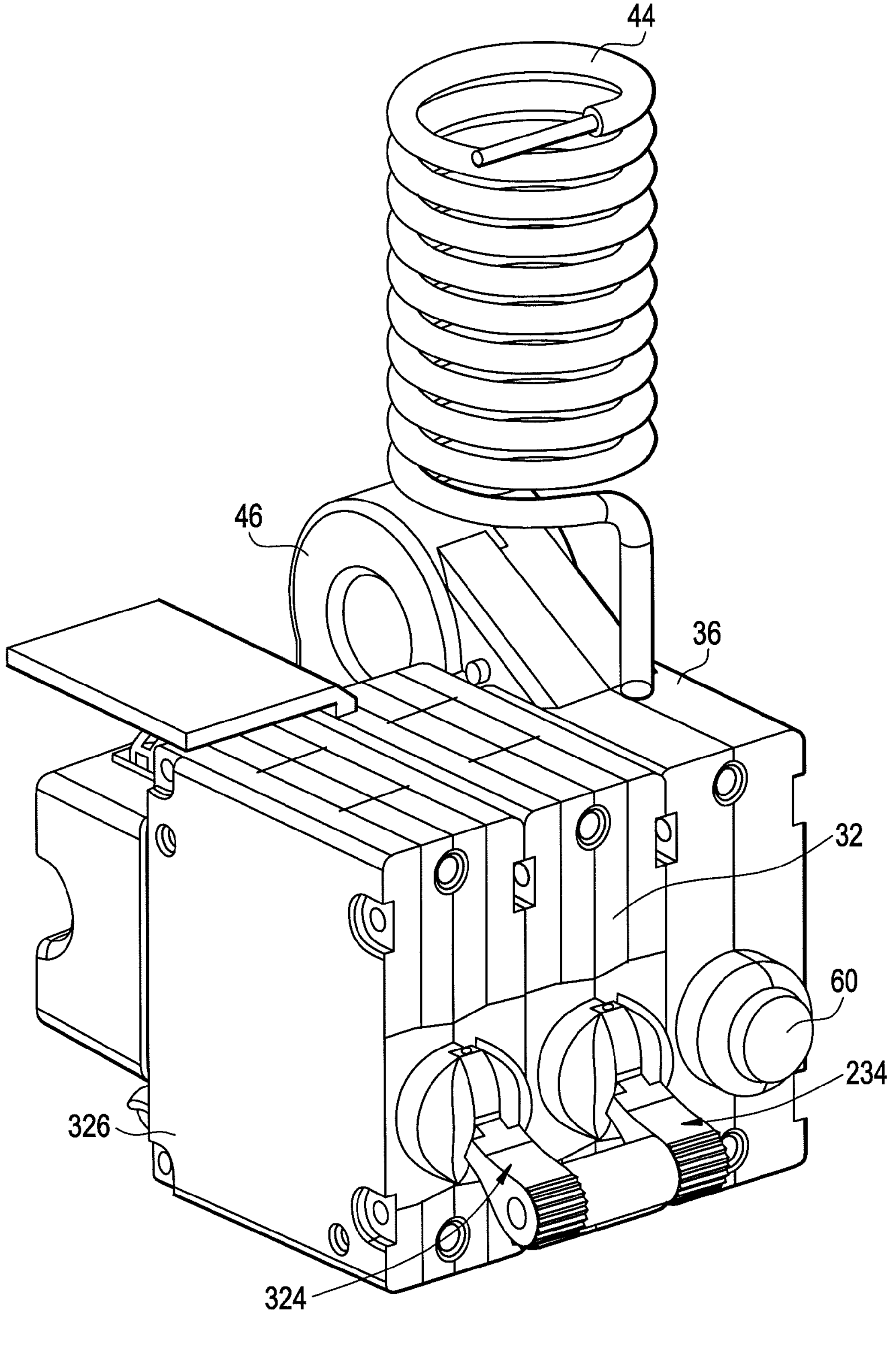
FIG. 26 shows a perspective view of a circuit breaker apparatus with a handle actuator according to at least an embodiment.
Figure 27:
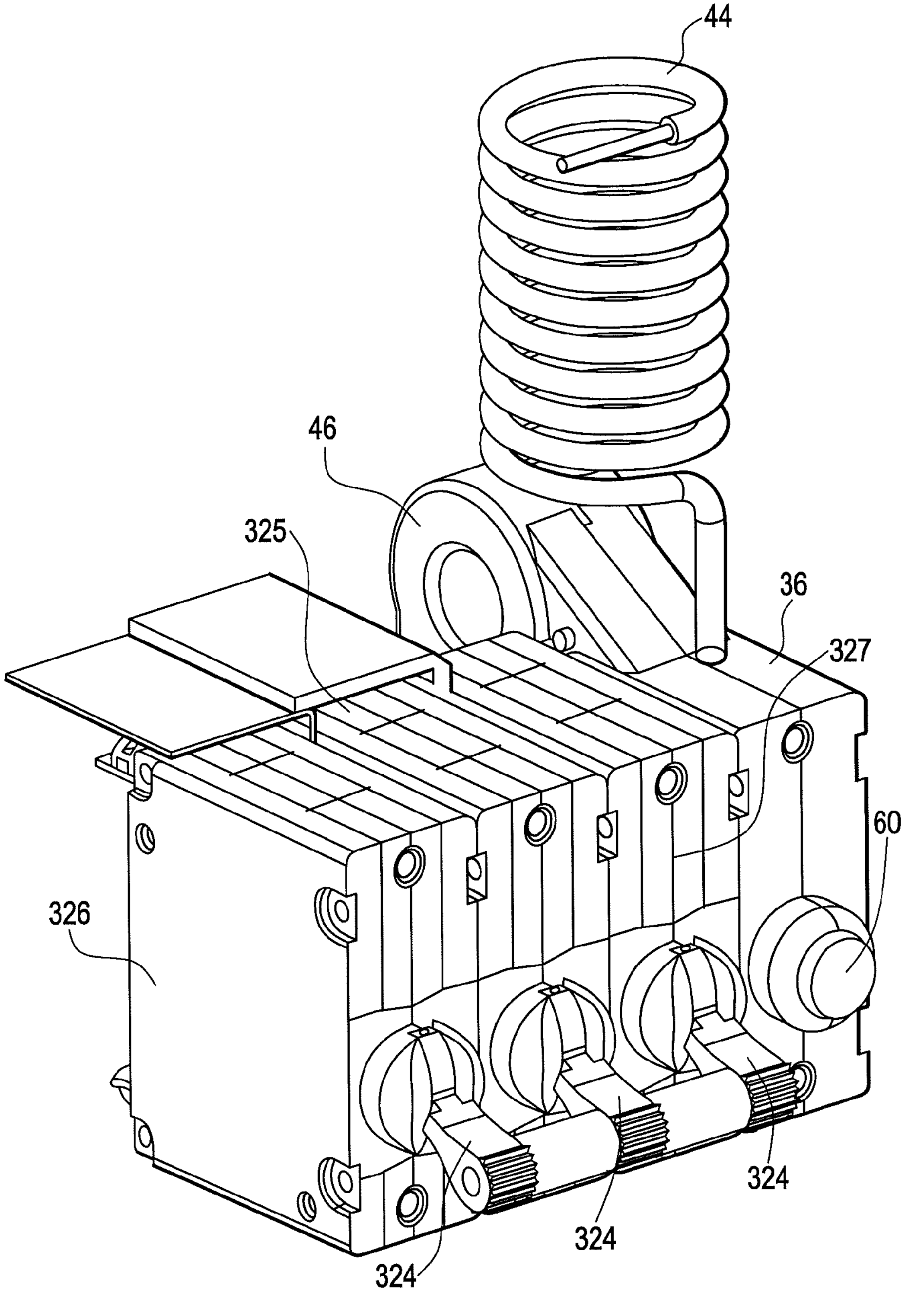
FIG. 27 shows a perspective view of a circuit breaker apparatus with a handle actuator according to at least an embodiment.

Additionally, FIGS. 25-27 illustrate a different possible embodiment of actuator, i.e., a handle actuator 324. It is also noted that it may be possible to have several handle actuators 324 on a given circuit breaker apparatus, for example if the device is a one-pole application (FIG. 25), two-pole application (FIG. 26), or a three-pole application (FIG. 27). In the one pole application, a single breaker 325 or circuit breaker module is provided. In a two pole application, an additional breaker 326 or circuit breaker module is provided. In a three pole application, a third breaker 327 or circuit breaker module is provided. These examples are meant for illustration only, and it will be understood that the device is not limited to one, two, or three pole applications, but that any number of poles can be used.

Figure 31:
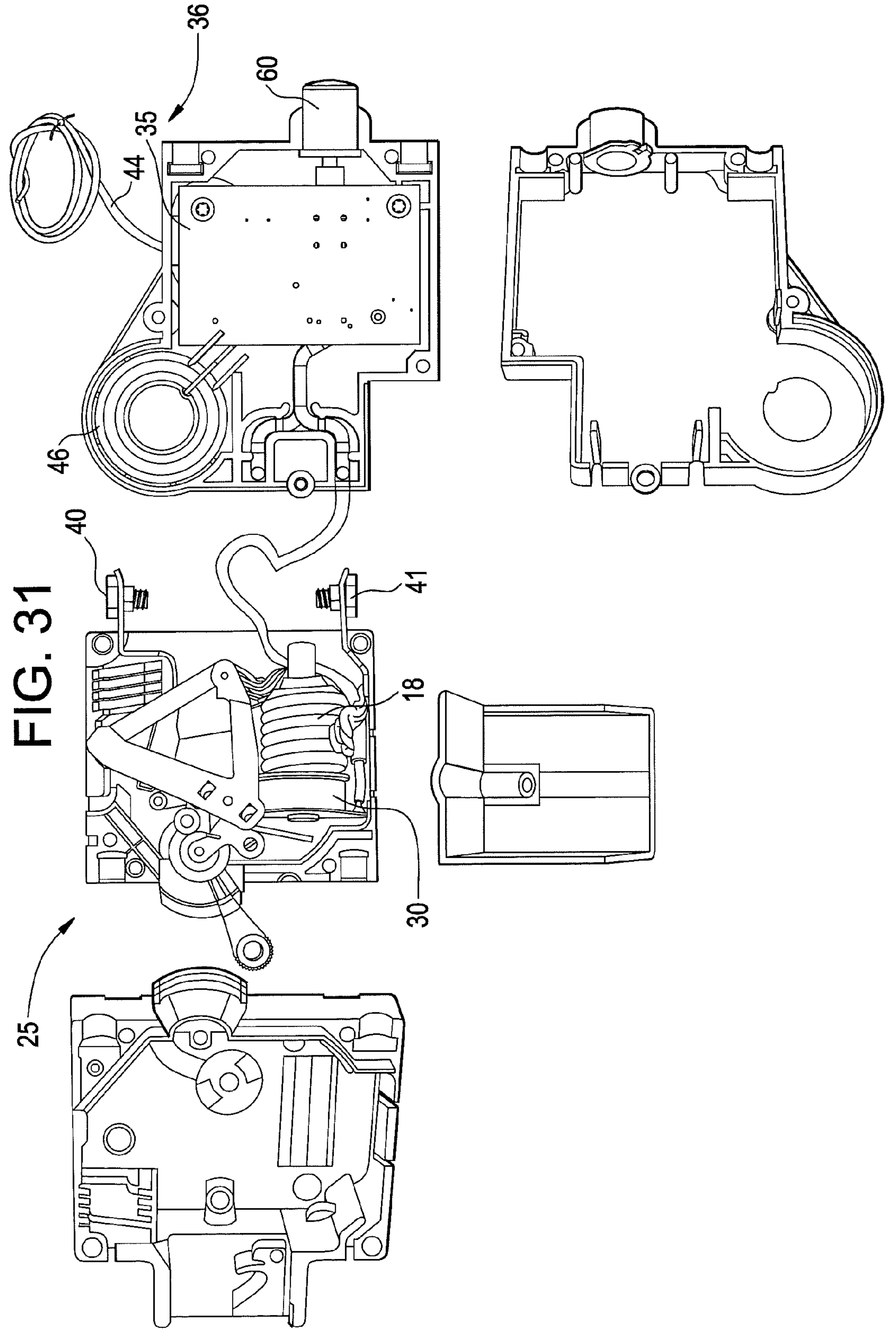
FIG. 31 shows a perspective view of a circuit breaker apparatus with a flat rocker actuator according to at least an embodiment.

FIG. 31 shows at least another embodiment of the circuit device. In the embodiment shown in FIG. 31, there is no external integrated ground fault signal input terminal 38 on the circuit breaker. Instead, this structure and connection is implemented internally. Additionally, the external GF electronics power terminal 42 is also omitted from the embodiment shown in FIG. 31.

Figure 32:
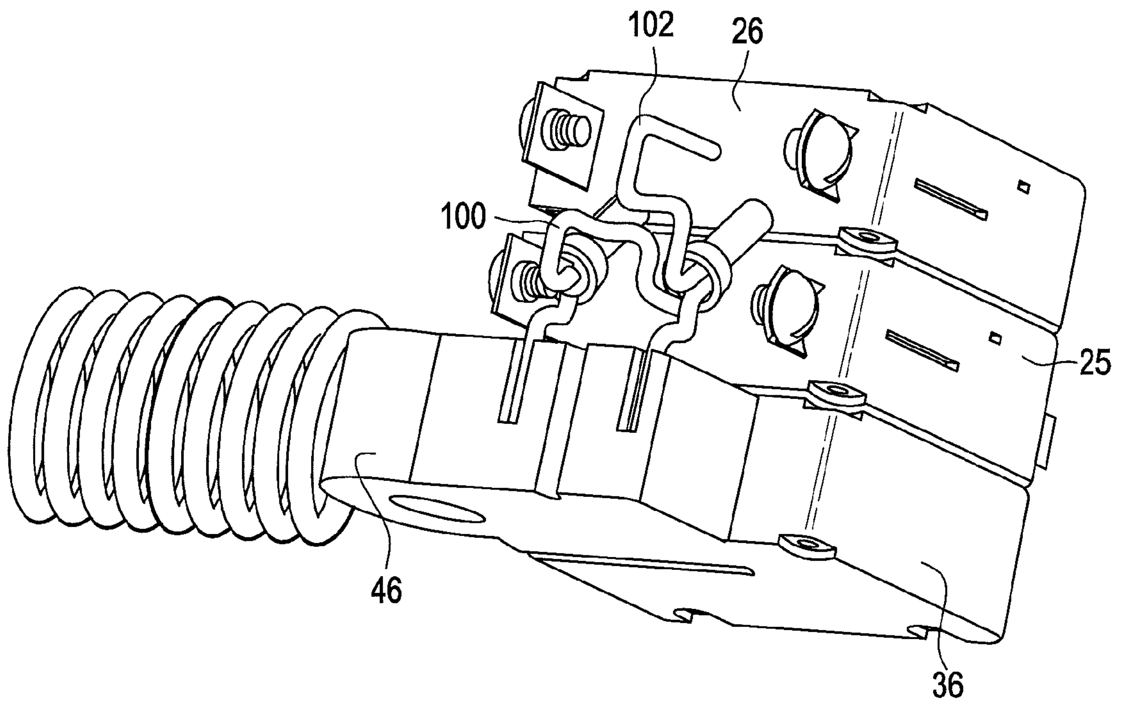
FIG. 32 shows a perspective view of a circuit breaker apparatus according to at least an embodiment.

FIG. 32 shows another embodiment of a circuit breaker apparatus in a two-pole configuration, i.e., with a circuit breaker module 25 and another circuit breaker module 26. FIG. 32 shows that wires 100, 102 can carry a trip signal from the ground fault electronics in ground fault electronics module 36 to both breaker module 25 and breaker module 26.

Figure 33:
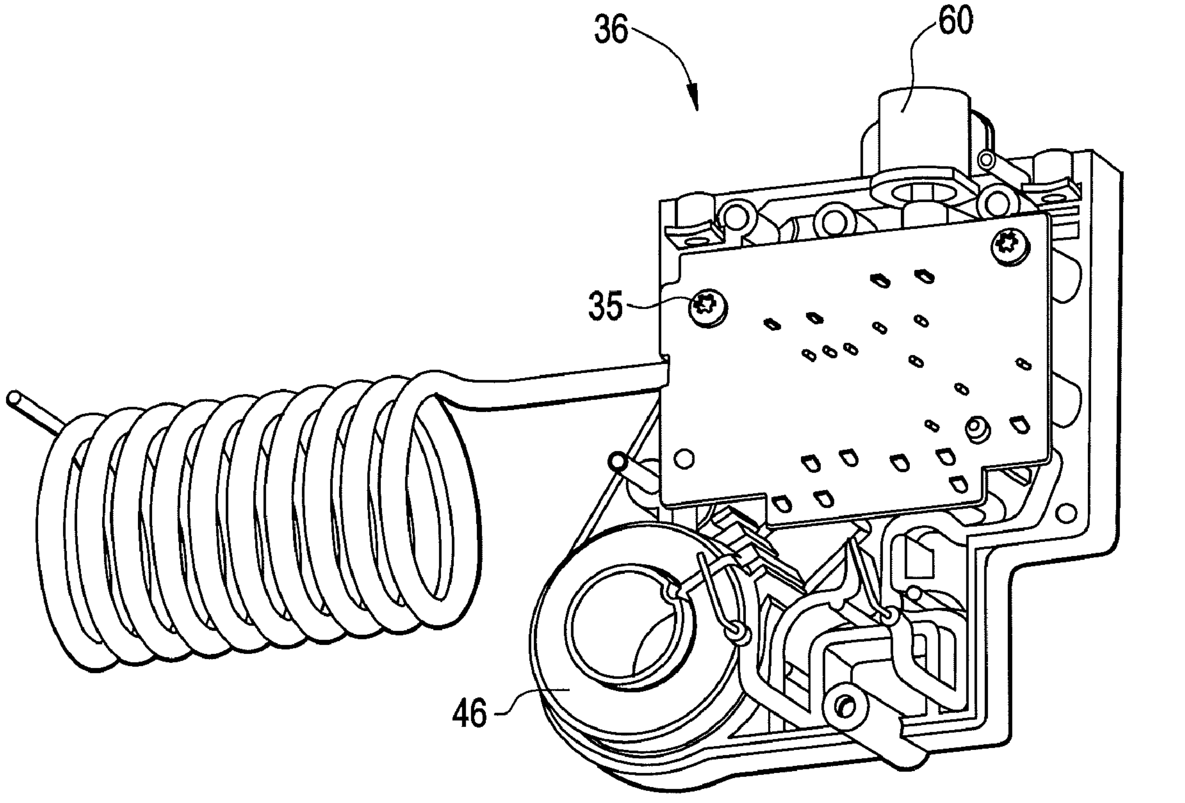
FIG. 33 shows perspective view of a ground fault electronics module according to at least an embodiment.
Figure 34:
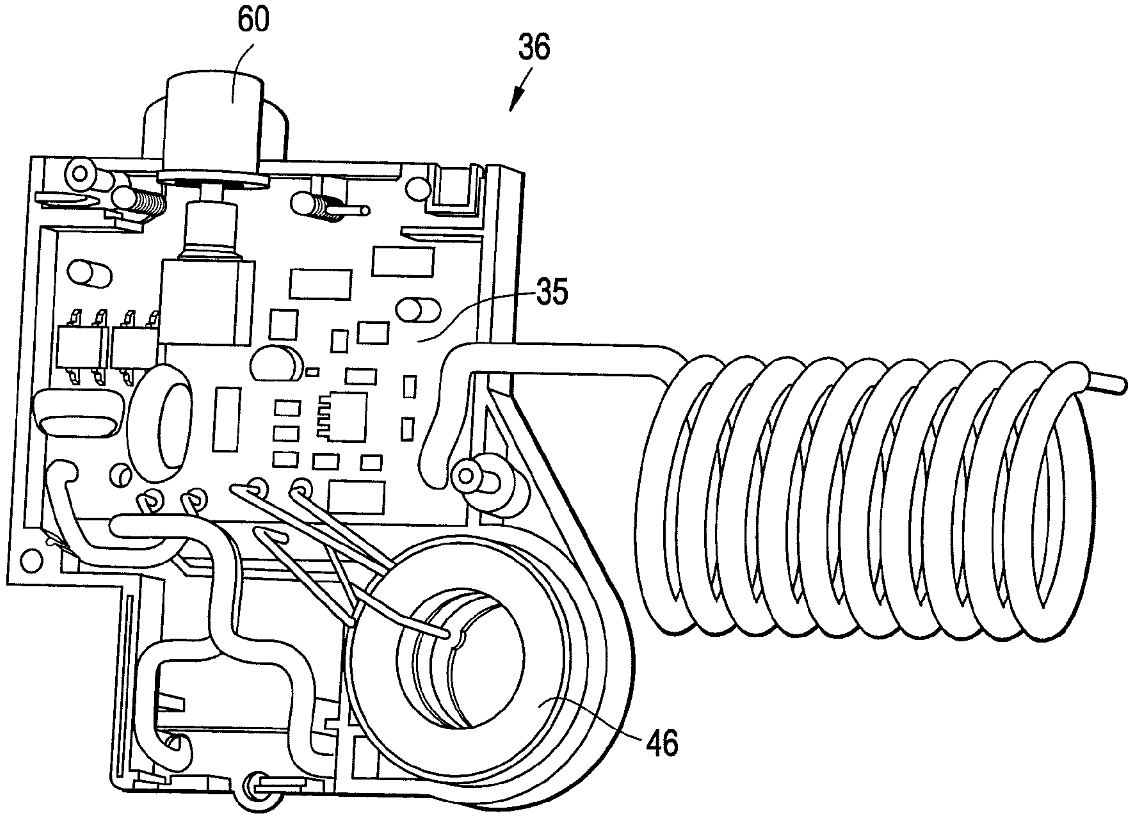
FIG. 34 shows a perspective view of a ground fault electronics module according to at least an embodiment.
Figure 35:
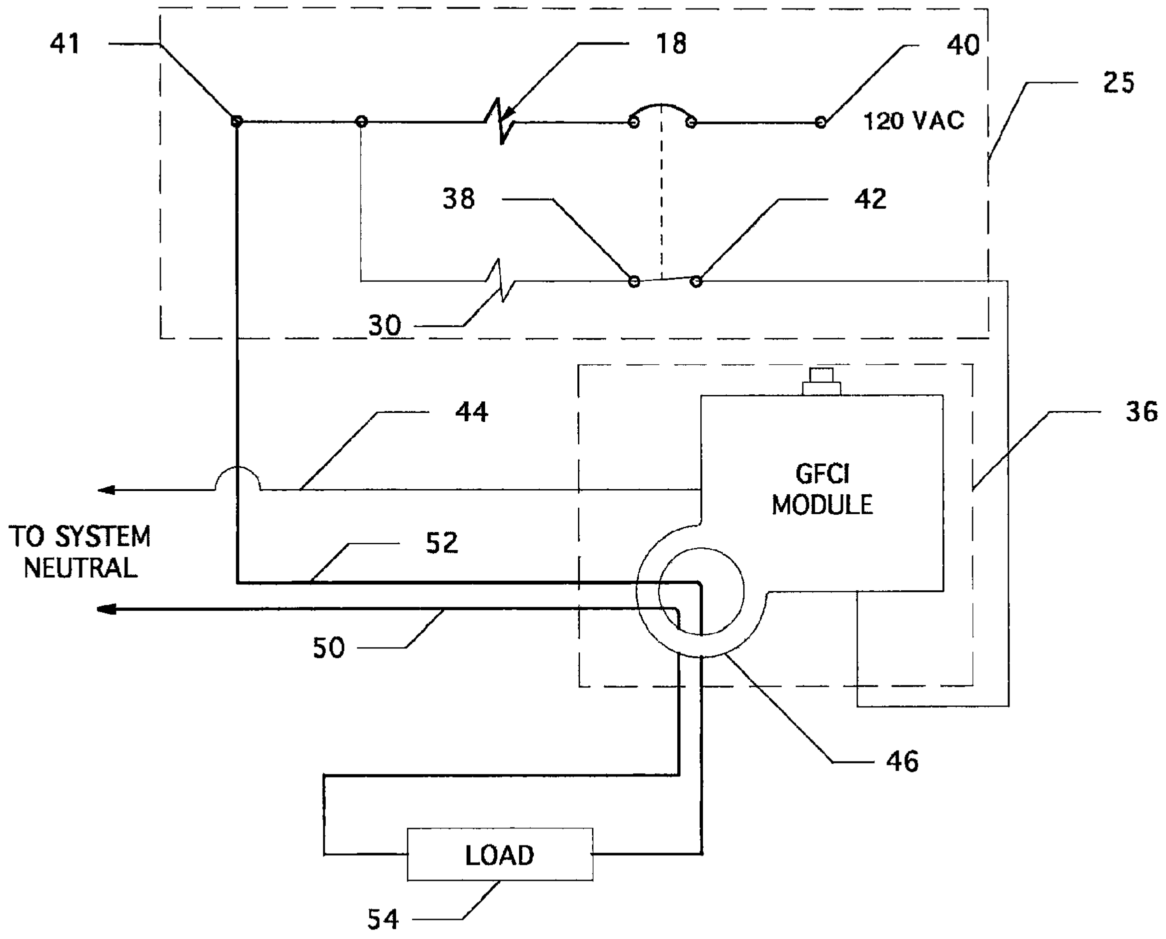
FIG. 35 shows a schematic of a circuit breaker according to at least an embodiment.
Figure 36:
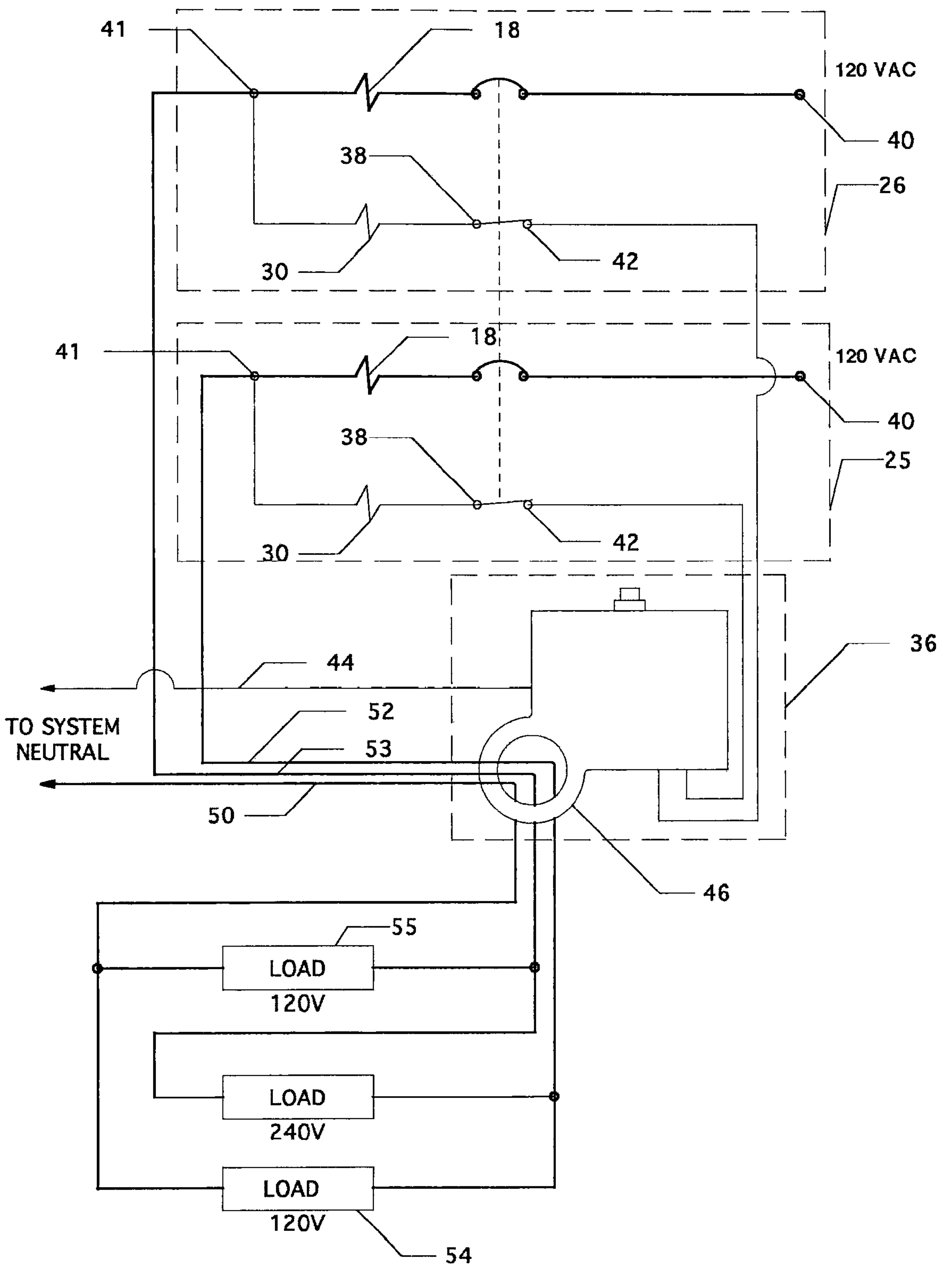
FIG. 36 shows a schematic of a circuit breaker according to at least an embodiment.

Additionally, FIGS. 33 and 34 show embodiments of the internal structure of ground fault electronics module 36.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A circuit breaker apparatus for interrupting overcurrent and ground fault in a circuit, the circuit breaker apparatus comprising:

an overcurrent coil for tripping the circuit breaker apparatus;

a voltage coil also for tripping the circuit breaker apparatus located proximate to the overcurrent coil, wherein a first terminal of the voltage coil is connected to a ground fault signal input terminal and a second terminal of the voltage coil is connected to a main output power terminal of the circuit breaker; and ground fault electronics connected to the voltage coil and structured to detect a ground fault in the circuit when the ground fault exceeds a threshold level;

wherein the ground fault electronics are structured to send a trip signal to the ground fault signal input terminal when a ground fault is detected; and the voltage coil is structured to trip the circuit breaker apparatus when the ground fault signal input terminal receives the trip signal from the ground fault electronics.

2. The circuit breaker apparatus of claim 1, wherein the ground fault electronics comprises:

a differential current transformer defining a wire hole;

a first wire having a first end connected to a load terminal of the circuit breaker apparatus and a second end connectable to a load, wherein the first wire passes through the wire hole; and a second wire structured to complete the circuit to the load, wherein the second wire passes through the wire hole.

3. The circuit breaker apparatus of claim 2, wherein the differential current transformer comprises a plurality of turns of small coils, and the plurality of turns of small coils is structured to produce a magnetic field when current is passed through the plurality of turns of small coils.

4. The circuit breaker apparatus of claim 3, wherein the differential current transformer is structured to detect a ground fault by measuring fluctuations in the magnetic field produced by the plurality of turns of small coils.

5. The circuit breaker apparatus of claim 1, wherein the ground fault electronics are structured to be programmable such that the threshold level may be varied.

6. The circuit breaker apparatus of claim 1, further comprising:

a main input power terminal structured to send current to the overcurrent coil; and a ground fault electronics power terminal;

wherein the main input power terminal and the ground fault electronics power terminal are formed on a single piece of metal.

7. The circuit breaker apparatus of claim 1, wherein the ground fault electronics are located in a ground fault electronics module connected to the circuit breaker apparatus.

8. The circuit breaker apparatus of claim 7, the ground fault electronics further comprising a differential current transformer connected to the ground fault electronics module.

9. The circuit breaker apparatus of claim 1, further comprising a rocker actuator.

10. The circuit breaker apparatus of claim 9, wherein the rocker actuator is structured such that the rocker actuator can be toggled between a first position and a second position; and when the rocker actuator is in the first position, the rocker actuator is flush with a surface of the circuit breaker apparatus.

11. The circuit breaker apparatus of claim 10, further comprising an actuator cover provided over a first end of the rocker actuator;

wherein a reset hole is provided through the actuator cover.

12. The circuit breaker apparatus of claim 1, further comprising a handle actuator.

13. A method of interrupting overcurrent and ground fault in a circuit including a load, the method comprising:

providing an overcurrent coil for tripping a circuit breaker apparatus;

providing a voltage coil for tripping the circuit breaker apparatus, the voltage coil being proximate to the overcurrent coil, wherein a first terminal of the voltage coil is connected to a ground fault signal input terminal and a second terminal of the voltage coil is connected to a main output power terminal of the circuit breaker;

detecting a ground fault in the circuit when the ground fault exceeds a threshold level by using ground fault electronics connected to the voltage coil;

sending a trip signal from the ground fault electronics to the ground fault signal input terminal when a ground fault is detected; and using the voltage coil to trip the circuit breaker apparatus when the ground fault signal input terminal receives the trip signal from the ground fault electronics.

14. The method of claim 13, wherein the detecting a ground fault in the circuit further comprises:

providing a differential current transformer that defines a wire hole;

providing a first wire with a first end connected to a load terminal of the circuit breaker apparatus and a second end connected to the load, wherein the first wire is passed through the wire hole;

providing a second wire to connect to the load and complete the circuit, wherein the second wire is passed through the wire hole; and measuring fluctuations in a magnetic field produced by the differential current transformer.

15. A device for interrupting overcurrent and ground fault in a circuit, the device comprising:

means for detecting and interrupting an overcurrent;

means for detecting a ground fault above a threshold level;

means for interrupting a ground fault;

means for sending a trip signal to the means for interrupting a ground fault when the ground fault is above a threshold level;

wherein the means for interrupting a ground fault comprises a voltage coil also for tripping the circuit breaker apparatus located proximate to the overcurrent coil, wherein a first terminal of the voltage coil is connected to a ground fault signal input terminal and a second terminal of the voltage coil is connected to a main output power terminal of the circuit breaker;

the means for sending a trip signal to the means for interrupting a ground fault is structured to send a trip signal to the ground fault signal input terminal when a ground fault is detected; and the voltage coil is structured to trip the circuit breaker apparatus when the ground fault signal input terminal receives the trip signal from the means for sending a trip signal to the means for interrupting a ground fault.

16. A device for interrupting overcurrent and ground fault in a circuit, the device comprising:

a circuit breaker module comprising:

an overcurrent coil for tripping the circuit breaker apparatus; and a voltage coil also for tripping the circuit breaker apparatus located proximate to the overcurrent coil, wherein a first terminal of the voltage coil is connected to a ground fault signal input terminal and a second terminal of the voltage coil is connected to a main output power terminal of the circuit breaker; and a ground fault electronics module comprising:

ground fault electronics connected to the voltage coil and structured to detect a ground fault in the circuit when the ground fault exceeds a threshold level;

wherein the ground fault electronics are structured to send a trip signal to the ground fault signal input terminal when a ground fault is detected; and the voltage coil is structured to trip the circuit breaker module when the ground fault signal input terminal receives the trip signal from the ground fault electronics.

17. The device of claim 16, further comprising at least one additional circuit breaker module, wherein the at least one additional circuit breaker module is internally or externally electrically connected to the circuit breaker module.

18. The device of claim 16, wherein the ground fault electronics module further comprises a differential current transformer defining a wire hole.

19. The device of claim 18, further comprising:

a first wire having a first end connected to a load terminal of the circuit breaker module and a second end that is connectable to a load, wherein the first wire passes through the wire hole; and a second wire structured to complete the circuit to the load, wherein the second wire passes through the wire hole.

20. The circuit breaker apparatus of claim 18, wherein the differential current transformer comprises a plurality of turns of small coils, and the plurality of turns of small coils is structured to produce a magnetic field when current is passed through the plurality of turns of small coils.

21. The circuit breaker apparatus of claim 20, wherein the differential current transformer is structured to detect a ground fault by measuring fluctuations in the magnetic field produced by the plurality of turns of small coils.

22. The circuit breaker apparatus of claim 16, wherein the ground fault electronics are structured to be programmable such that the threshold level may be varied.

* * * * *